(12) United States Patent
Que et al.

(10) Patent No.: US 11,829,309 B2
(45) Date of Patent: Nov. 28, 2023

(54) DATA FORWARDING CHIP AND SERVER

(71) Applicant: HUAWEI TECHNOLOGIES CO., LTD., Guangdong (CN)

(72) Inventors: Mingjian Que, Hangzhou (CN); Junjie Wang, Hangzhou (CN); Tao Li, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/698,059

(22) Filed: Mar. 18, 2022

(65) Prior Publication Data
US 2022/0206969 A1 Jun. 30, 2022

Related U.S. Application Data

(63) Continuation of application No. PCT/CN2020/097867, filed on Jun. 24, 2020.

(30) Foreign Application Priority Data

Sep. 21, 2019 (CN) .......................... 201910895926.4

(51) Int. Cl.
*G06F 13/16* (2006.01)
*G06F 13/42* (2006.01)

(52) U.S. Cl.
CPC .......... *G06F 13/1684* (2013.01); *G06F 13/42* (2013.01)

(58) Field of Classification Search
CPC ...... G06F 13/42; G06F 13/1684; G06F 13/28; G06F 12/0806; H04L 45/745
See application file for complete search history.

(56) References Cited

U.S. PATENT DOCUMENTS 10,740,018 B2 * 8/2020 Luo .................. G06F 3/0683
11,138,147 B2 * 10/2021 Liu .................. G06F 11/0724
(Continued)

FOREIGN PATENT DOCUMENTS

CN 101013989 A 8/2007
CN 104579695 A 4/2015
(Continued)

OTHER PUBLICATIONS

International Search Report and Written Opinion issued in PCT/CN2020/097867, dated Oct. 9, 2020, 11 pages.
(Continued)

*Primary Examiner* — Brian T Misiura

(57) ABSTRACT

A data forwarding chip and a server are disclosed. The server includes a data forwarding chip, a network interface card, and a processor. The data forwarding chip is separately connected to the network interface card and the processor through a bus. After receiving a data forwarding request sent by the processor or the network interface card, the data forwarding chip forwards, based on a destination address of the data forwarding request through an endpoint port that is on the forwarding chip and that is directly connected to a memory space corresponding to the destination address of the data forwarding request, to-be-forwarded data specified in the data forwarding request, such that when the server sends or receives data, cross-chip transmission of data between processors occurs, thereby reducing a data transmission delay.

15 Claims, 9 Drawing Sheets

(56) References Cited

U.S. PATENT DOCUMENTS

| | | | | |
|---|---|---|---|---|
| 11,201,760 B2 * | 12/2021 | Han | ................ | H04L 45/74 |
| 2013/0111142 A1 * | 5/2013 | Zheng | ................ | G06F 12/0811 |
| | | | | 711/130 |
| 2015/0113230 A1 * | 4/2015 | Cheng | ................ | G06F 12/0824 |
| | | | | 711/145 |
| 2015/0189039 A1 * | 7/2015 | Cheng | ................ | G06F 12/0831 |
| | | | | 709/216 |
| 2018/0302326 A1 | 10/2018 | Thakkar et al. | | |
| 2019/0020601 A1 * | 1/2019 | Liu | ................ | H04L 45/745 |

FOREIGN PATENT DOCUMENTS

| | | |
|---|---|---|
| CN | 105404597 A | 3/2016 |
| CN | 106789756 A | 5/2017 |

OTHER PUBLICATIONS

Office Action issued in CN201910895926.4, dated Jul. 29, 2023, 7 pages.

* cited by examiner

DATA FORWARDING CHIP AND SERVER

CROSS-REFERENCE TO RELATED APPLICATIONS

This application is a continuation of International Application No. PCT/CN2020/097867, filed on Jun. 24, 2020, which claims priority to Chinese Patent Application No. 201910895926.4 filed on Sep. 21, 2019. The disclosures of the aforementioned applications are hereby incorporated by reference in their entireties.

TECHNICAL FIELD

This application relates to the server field, and in particular, to a data forwarding chip and a server.

BACKGROUND

As data increases exponentially, a server is usually equipped with a plurality of processors, and the plurality of processors in the server share a network interface card. However, the network interface card shared by the plurality of processors is usually connected to only one processor. When a processor that is not directly connected to the network interface card needs to send data by using the network interface card, the data needs to be transmitted to the network interface card through a data bus between the processors. Consequently, I/O overheads of a system and a data transmission delay increase.

SUMMARY

Embodiments of this application provide a server and a data forwarding chip, so that when the server sends or receives data, cross-chip transmission of data between processors of the server can be avoided, thereby reducing a data transmission delay.

According to a first aspect, an embodiment of this application provides a server. The server includes a data forwarding chip, a network interface card, and a target processor, and the data forwarding chip is separately connected to the network interface card and the target processor through a bus.

The data forwarding chip is configured to receive a data forwarding request sent by the target processor or the network interface card; and forward, through a target endpoint port, to-be-forwarded data specified in the data forwarding request, where the target endpoint port is an endpoint port that is on the data forwarding chip and that is directly connected to a memory space corresponding to an address of the data forwarding request, and the address of the data forwarding request includes a source address of the to-be-forwarded data or a destination address into which the to-be-forwarded data needs to be written.

The data forwarding chip configured to forward data is added between the processor and the network interface card of the server, so that when the network interface card needs to read data in a target memory space of the server, the data forwarding chip reads the data from the target memory space through a target endpoint port that is on the data forwarding chip and that is directly connected to the target memory space, and then sends the read data to the network interface card; or when the network interface card needs to write data into the target memory space of the server, the network interface card writes the data into the target memory space through the target endpoint port, so as to avoid a problem that when the server sends or receive data, cross-chip transmission of the data needs to be performed through a communication bus between processors, thereby reducing a data transmission delay.

In a possible implementation, the data forwarding chip is further configured to determine, based on the address of the data forwarding request and memory distribution information of the server, the target endpoint port directly connected to the memory space corresponding to the address of the data forwarding request, where the memory distribution information includes a correspondence between a memory space of the server and each of at least two of a plurality of endpoint ports on the data forwarding chip.

In this embodiment, the data forwarding chip includes the plurality of endpoint ports, the plurality of endpoint ports are connected to the memory space of the server through a bus, and the at least two of the plurality of endpoint ports are directly connected to the memory space of the server. Therefore, when the data forwarding chip or the network interface card reads data in the memory space or writes data into the memory space, two reading/writing paths exist. The data forwarding chip may determine, by using the correspondence between the memory space of the server and each of the at least two endpoint ports, that an endpoint port directly connected to the memory space corresponding to the address of the data forwarding request is the target endpoint port, and further determine that a path passing through the target endpoint port is a shortest path.

In a possible implementation, the server includes a plurality of processors, each of the plurality of processors corresponds to a memory space having a preset address range, each processor is directly connected to the corresponding memory space having the preset address range, the memory distribution information includes a correspondence between each of the at least two of the plurality of endpoint ports and the memory space that has the preset address range and that corresponds to each of the plurality of processors, and the target processor is any of the plurality of processors.

In a possible implementation, the server may use a non-uniform memory access (NUMA) architecture. In the NUMA architecture, hardware resources of the server are divided into a plurality of NUMA nodes, and each NUMA node includes one or more CPUs in the server and one or more memories.

The data forwarding chip stores a correspondence between each endpoint port and a memory space address in the server. Each endpoint port is directly connected to a memory space in a segment of address range. When receiving the data forwarding request, the data forwarding chip determines the source address or the destination address of the to-be-forwarded data by using the data forwarding request; determines, based on the source address or the destination address of the to-be-forwarded data, the target endpoint port directly connected to the memory space of the server; and further reads data from the memory space or writes data into the memory space through the target endpoint port.

In a possible implementation, the target processor is configured to send the data forwarding request to the data forwarding chip through the bus, where the data forwarding request carries the source address of the to-be-forwarded data.

The data forwarding chip is further configured to determine, based on the source address carried in the data forwarding request and the memory distribution information of the server, that an endpoint port directly connected to a memory space corresponding to the source address is the target endpoint port. When the target processor needs to send data in the memory space by using the network interface card, the target processor sends, to the data forwarding chip, the data forwarding request that carries the source address of the to-be-forwarded data; and the data forwarding chip determines, based on the source address and the correspondence in the memory distribution information, the target endpoint port directly connected to the memory space corresponding to the source address of the to-be-forwarded data.

In a possible implementation, the network interface card is configured to send the data forwarding request to the data forwarding chip, where the data forwarding request is a data writing request sent by the network interface card to the target processor.

The data forwarding chip is further configured to determine, based on a preset destination address of the data writing request and the memory distribution information of the server, that an endpoint port directly connected to a memory space corresponding to the destination address is the target endpoint port, where the destination address is allocated by the target processor and is used to buffer an address corresponding to a memory space of the to-be-forwarded data.

In this embodiment, the server pre-allocates a buffer space to store data received by the network interface card. After receiving the data writing request of the network interface card, the data forwarding chip obtains address information of the buffer space, and determines, in combination with the memory distribution information, that an endpoint port that is on the data forwarding chip and that is directly connected to the buffer space is the target endpoint port.

In a possible implementation, the data forwarding chip is further configured to:
  determine, based on the target endpoint port, a path for forwarding the to-be-forwarded data, where the path includes the target endpoint port; and
  obtain, through the path, the to-be-forwarded data from the memory space corresponding to the source address of the to-be-forwarded data and buffer the to-be-forwarded data; and send, to the network interface card, a buffer address for buffering the to-be-forwarded data, so that the network interface card obtains the to-be-forwarded data based on the buffer address; or
  obtain the to-be-forwarded data from the network interface card, and send, through the path, the to-be-forwarded data to the memory space corresponding to the address of the data forwarding request.

In a possible implementation, the data forwarding chip obtains, through the path in a direct memory access (DMA) manner, the to-be-forwarded data from the memory space corresponding to the source address; or the data forwarding chip sends, through the path in the direct memory access (DMA) manner, the to-be-forwarded data to the memory space corresponding to the address of the data forwarding request.

In a possible implementation, the network interface card obtains, in the DMA manner, the to-be-forwarded data from a buffer space corresponding to the buffer address of the data forwarding chip.

After determining the target endpoint port, the data forwarding chip may determine a shortest path that passes through the target endpoint port. The data forwarding chip obtains, through the shortest path, the to-be-forwarded data from the memory space corresponding to the source address of the to-be-forwarded data; or writes, through the shortest path, the to-be-forwarded data into the memory space corresponding to the address of the data forwarding request, so as to avoid that when the network interface card reads data in the memory space or writes data into the memory space, cross-chip transmission is performed on the data between processors, which increases a data transmission delay, thereby reducing resource consumption of the processor.

In a specific implementation, the data forwarding chip and the network interface card are devices that support a single-root input/output virtualization (SR-IOV) standard.

In a possible implementation, the data forwarding chip is further configured to: enumerate the network interface card to obtain information about a functional unit in the network interface card, and allocate an address to the functional unit, where the functional unit is configured to implement a function of the network interface card, and the information about the functional unit includes information about a physical function (PF) and/or information about a virtual function (VF).

The target processor is configured to: enumerate the data forwarding chip to obtain information about a proxy unit in the data forwarding chip, allocate an address to the proxy unit, and send address information of the proxy unit to the data forwarding chip, where the proxy unit is a proxy of the functional unit.

The data forwarding chip is further configured to establish a correspondence between the address information of the proxy unit and address information of the functional unit based on the address information of the proxy unit.

In this embodiment, the server includes a plurality of processors, and a first processor in the plurality of processors is connected to the data forwarding chip through a bus.

The data forwarding chip is further configured to: enumerate the network interface card to obtain information about a first functional unit in the network interface card, and allocate an address to the first functional unit, where the first functional unit is configured to implement a function of the network interface card, and the information about the first functional unit includes information about a first physical function (PF) and/or information about a first virtual function (VF).

The first processor is configured to: enumerate the data forwarding chip to obtain information about a first proxy unit in the data forwarding chip, allocate an address to the first proxy unit, and send address information of the first proxy unit to the data forwarding chip, where the first proxy unit is a proxy of the first functional unit.

The data forwarding chip is further configured to establish a correspondence between the address information of the first proxy unit and address information of the first functional unit based on the address information of the first proxy unit.

The server further includes a second processor, and the second processor is separately connected to the data forwarding chip and the first processor through the bus.

The data forwarding chip is further configured to: enumerate the network interface card to obtain information about a second functional unit in the network interface card, and allocate an address to the second functional unit, where the second functional unit is configured to implement a function of the network interface card, and the information about the second functional unit includes information about a second physical function (PF) and/or information about a second virtual function (VF).

The second processor is configured to: enumerate the data forwarding chip to obtain information about a second proxy unit in the data forwarding chip, allocate an address to the second proxy unit, and send address information of the second proxy unit to the data forwarding chip, where the second proxy unit is a proxy of the second functional unit.

The data forwarding chip is further configured to establish a correspondence between the address information of the second proxy unit and address information of the second functional unit based on the address information of the second proxy unit.

In a possible implementation, the PF information of the first functional unit includes bus device function (BDF) information and a base address register (BAR) space address that are of the first PF. The information about the first virtual function VF includes BDF information and a BAR space address that are of the first YE Information about the first proxy unit includes a BDF and a BAR space address that are of the first proxy unit PF'. The PF information of the second functional unit includes bus device function (BDF) information and a base address register (BAR) space address that are of the second PF. The information about the second virtual function VF includes BDF information and a BAR space address that are of the second VF. Information about the second proxy unit includes a BDF and a BAR space address that are of the second proxy unit PF'.

In a possible implementation, the data forwarding chip is further configured to forward the data forwarding request between the processor and the network interface card based on the correspondence between the address information of the proxy unit in the data forwarding chip and the address information of the functional unit in the network interface card.

In a possible implementation, the data forwarding chip receives a first access request sent by the network interface card, where the first access request is used to access the target processor, the data forwarding request includes a data reading request and a data writing request, and a source address of the first access request is the address information of the functional unit in the network interface card; maps the first access request to a second access request, where a source address of the second access request is the address information of the proxy unit in the data forwarding chip; and sends the second access request to the target processor through the target endpoint port.

In a possible implementation, after the data forwarding chip determines, based on the target endpoint port, the path for forwarding the to-be-forwarded data, the data forwarding chip is further configured to: send the source address of the to-be-forwarded data to the network interface card; receive a first data reading request sent by the network interface card to the target processor based on the source address of the to-be-forwarded data, where the data reading request carries the address information of the functional unit in the network interface card; replace the address information of the functional unit with the address information of the proxy unit to obtain a second data reading request; and send the second data reading request to the target processor.

In a possible implementation, the data forwarding chip receives a first data writing request sent by the network interface card, where the first data writing request carries the address information of the functional unit in the network interface card; replaces the address information of the functional unit with the address information of the proxy unit to obtain a second data writing request; and sends the second data writing request to the target processor.

In a possible implementation, the network interface card obtains data in the corresponding memory space from the source address of the to-be-forwarded data through the target endpoint port in the DMA manner; or the network interface card writes received data into the memory space through the target endpoint port in the DMA manner.

If the data forwarding chip is only configured to determine the shortest path, when the network interface card needs to directly obtain data in the memory space or write data into the memory unit through the shortest path, the network interface card needs to send an access request to the target processor, where the access request carries the address information of the functional unit in the network interface card. The target processor is directly connected to the data forwarding chip, the target processor cannot identify the access request sent by the network interface card. Therefore, when the access request passes through the data forwarding chip, the data forwarding chip replaces the information that is in the access request and that is about the functional unit in the network interface card with the information about the corresponding proxy unit in the data forwarding chip, so that the target processor can identify the access request.

In a possible implementation, the target processor is further configured to: load a driver of the data forwarding chip, obtain the memory distribution information by running the driver, and send the memory distribution information to the data forwarding chip.

In a possible implementation, the server includes two, four, or eight processors, and every two processors are connected to a network interface card by using a data forwarding chip.

According to a second aspect, an embodiment of this application provides a data forwarding chip. The data forwarding chip includes a routing module, at least two first endpoint ports, and a second endpoint port, the at least two first endpoint ports are respectively connected to at least two processors of a server, and the second endpoint port is connected to a network interface card of the server.

The routing module is configured to: separately connected to the first endpoint port and the second endpoint port; receive, through the first endpoint port, a data forwarding request sent by a target processor; or receive, through the second endpoint port, a data forwarding request sent by the network interface card; and forwards, through a target endpoint port, to-be-forwarded data specified in the data forwarding request, where the target endpoint port is an endpoint port that is in the at least two first endpoint ports and that is directly connected to a memory space corresponding to an address of the data forwarding request, and the target processor is any of the at least two processors.

In a possible implementation, the data forwarding chip further includes:

a recording module, configured to record memory distribution information of the server, where the memory distribution information includes a correspondence between a memory space of the server and each of the at least two first endpoint ports.

The routing module is further configured to:

obtain the memory distribution information of the server from the recording module, and determine the target endpoint port based on the memory distribution information and the address of the data forwarding request.

In a possible implementation, the memory distribution information is obtained by the target processor by loading a driver of the data forwarding chip and running the driver. After receiving, through the first endpoint port, the memory distribution information sent by the target processor, the routing module sends the memory distribution information to the recording module for storage.

In a possible implementation, the memory distribution information includes a correspondence between each of the at least two first endpoint ports and a memory space that has a preset address range and that corresponds to each of the at least two processors in the server. The server includes a plurality of target processors, each of the at least two processors corresponds to the memory space having the preset address range, and each processor is directly connected to the corresponding memory space having the preset address range.

In a possible implementation, the routing module is further configured to:
obtain, through the at least two first endpoint ports, the data forwarding request sent by the target processor, where the data forwarding request carries a source address of the to-be-forwarded data; and
determine, based on the source address carried in the data forwarding request and the memory distribution information of the server, that an endpoint port directly connected to a memory space corresponding to the source address is the target endpoint port.

In a possible implementation, the routing module is further configured to:
obtain, through the second endpoint port, the data forwarding request sent by the network interface card, where the data forwarding request is a data writing request sent by the network interface card to the target processor; and
determine, based on a preset destination address of the data writing request and the memory distribution information of the server, the target endpoint port directly connected to a memory space corresponding to the preset destination address of the data writing request, where the preset destination address of the data writing request is allocated by the target processor and is used to buffer an address corresponding to a memory space of the to-be-forwarded data.

In a possible implementation, the routing module is further configured to:
determine, based on the target endpoint port, a path for forwarding the to-be-forwarded data, where the path includes the target endpoint port directly connected to the memory space corresponding to the address of the data forwarding request.

The data forwarding chip further includes a direct memory access (DMA) engine, configured to: obtain the to-be-forwarded data from the memory space corresponding to the source address of the to-be-forwarded data and buffer the to-be-forwarded data; and send, to the network interface card, a buffer address for buffering the to-be-forwarded data, so that the network interface card obtains the to-be-forwarded data based on the buffer address; or
obtain the to-be-forwarded data from the network interface card, and send, through the path, the to-be-forwarded data to the memory space corresponding to the address of the data forwarding request.

In a possible implementation, the routing module is further configured to: enumerate the network interface card to obtain information about a functional unit in the network interface card, and allocate an address to the functional unit, where the functional unit is configured to implement a function of the network interface card, and the information about the functional unit includes information about a physical function (PF) and/or information about a virtual function (VF);
receive address information that is of a proxy unit and that is sent by the target processor, where the proxy unit is a proxy of the functional unit, and the address information of the proxy unit is obtained after the target processor enumerates the data forwarding chip to obtain information about the proxy unit in the data forwarding chip, and allocates an address to the proxy unit; and
establish a correspondence between the address information of the proxy unit and address information of the functional unit based on the address information of the proxy unit, and send the correspondence between the address information of the proxy unit and the address information of the functional unit to the recording module for storage.

In a possible implementation, after the routing module determines, based on the target endpoint port, the path for forwarding the to-be-forwarded data, the routing module is further configured to: send the source address of the to-be-forwarded data to the network interface card; receive a data reading request sent by the network interface card to the target processor based on the source address of the to-be-forwarded data; or receive, when the network interface card needs to write the to-be-forwarded data into a memory space, a data writing request sent by the network interface card; and send the data reading request or the data writing request to the target processor through the path.

In a possible implementation, the routing module is further configured to: receive an access request sent by the network interface card, and forward the access request to the target processor based on the correspondence between the address information of the functional unit in the network interface card and the address information of the proxy unit in the data forwarding chip, where the access request is a data reading request or a data writing request.

In a possible implementation, the routing module receives a first access request sent by the network interface card, where the first access request is used to access the target processor, the data forwarding request includes a data reading request and a data writing request, and a source address of the first access request is the address information of the functional unit in the network interface card; maps the first access request to a second access request, where a source address of the second access request is the address information of the proxy unit in the data forwarding chip; and sends the second access request to the target processor through the target endpoint port.

In a possible implementation, the data forwarding chip may be implemented by using a field programmable gate array FPGA, or may be implemented by using an application-specific integrated circuit ASIC chip.

According to a third aspect, an embodiment of this application provides a data forwarding method, and the method includes: A data forwarding chip receives a data forwarding request sent by a target processor or a network interface card; and the data forwarding chip forwards, through a target endpoint port, to-be-forwarded data specified in the data forwarding request, where the target endpoint port is an endpoint port that is in at least two first endpoint ports on the data forwarding chip and that is directly connected to a memory space corresponding to an address of the data forwarding request. The data forwarding chip includes the at least two first endpoint ports and a second endpoint port, the at least two first endpoint ports are respectively connected to at least two processors of a server, the second endpoint port is connected to the network interface card of the server, and the target processor is any of the at least two processors.

In a possible implementation, the data forwarding chip determines the target endpoint port based on the address of the data forwarding request and the memory distribution information of the server, where the memory distribution information includes a correspondence between a memory space of the server and each of the at least two first endpoint ports.

In a possible implementation, the memory distribution information includes a correspondence between each of the at least two first endpoint ports and a memory space that has a preset address range and that corresponds to each of the at least two processors, each of the at least two processors corresponds to the memory space having the preset address range, and each processor is directly connected to the corresponding memory space having the preset address range.

In a possible implementation, that the data forwarding chip determines the target endpoint port based on the address of the data forwarding request and the memory distribution information of the server includes:

The data forwarding chip obtains, through any of the at least two first endpoint ports, the data forwarding request sent by the target processor, where the data forwarding request carries a source address of the to-be-forwarded data.

The data forwarding chip determines, based on the source address carried in the data forwarding request and the memory distribution information of the server, that a first endpoint port directly connected to a memory space corresponding to the source address is the target endpoint port.

In a possible implementation, that the data forwarding chip determines the target endpoint port based on the address of the data forwarding request and the memory distribution information of the server includes:

The data forwarding chip receives the data forwarding request sent by the network interface card, where the data forwarding request is a data writing request sent by the network interface card to the target processor.

The data forwarding chip determines, based on a preset destination address of the data writing request and the memory distribution information of the server, that an endpoint port directly connected to a memory space corresponding to the destination address is the target endpoint port, where the destination address is allocated by the target processor and is used to buffer an address corresponding to a memory space of the to-be-forwarded data.

In a possible implementation, that the data forwarding chip forwards, through a target endpoint port, to-be-forwarded data specified in the data forwarding request includes:

The data forwarding chip determines, based on the target endpoint port, a path for forwarding the to-be-forwarded data, where the path includes the target endpoint port.

The data forwarding chip obtains, through the path, the to-be-forwarded data from the memory space corresponding to the source address of the to-be-forwarded data and buffers the to-be-forwarded data; and sends, to the network interface card, a buffer address for buffering the to-be-forwarded data, so that the network interface card obtains the to-be-forwarded data based on the buffer address.

Alternatively, the data forwarding chip obtains the to-be-forwarded data from the network interface card, and sends, through the path, the to-be-forwarded data to the memory space corresponding to the address of the data forwarding request.

In a possible implementation, before the data forwarding chip forwards, through a target endpoint port, to-be-forwarded data specified in the data forwarding request, the method further includes:

The data forwarding chip enumerates the network interface card to obtain information about a functional unit in the network interface card, and allocates an address to the functional unit, where the functional unit is configured to implement a function of the network interface card, and the information about the functional unit includes information about a physical function (PF) and/or information about a virtual function (VF).

The data forwarding chip receives address information that is of a proxy unit and that is sent by the target processor, where the proxy unit is a proxy that is of the functional unit and that is in the data forwarding chip, and the address information of the proxy unit is obtained after the target processor enumerates the data forwarding chip to obtain information about the proxy unit in the data forwarding chip, and allocates an address to the proxy unit.

The data forwarding chip establishes a correspondence between the address information of the proxy unit and address information of the functional unit based on the address information of the proxy unit.

In a possible implementation, the method further includes: The data forwarding chip enumerates the network interface card to obtain information about a first functional unit in the network interface card, and allocates an address to the first functional unit, where the first functional unit is configured to implement a function of the network interface card, and the information about the first functional unit includes information about a first physical function (PF) and/or information about a first virtual function (VF).

The data forwarding chip receives information that is sent by a first processor and that is about a first proxy unit in the data forwarding chip, where the first proxy unit is a proxy of the first functional unit, and address information of the first proxy unit is obtained after the first processor enumerates the data forwarding chip to obtain the information about the first proxy unit in the data forwarding chip, and allocates an address to the first proxy unit.

The data forwarding chip establishes a correspondence between the address information of the first proxy unit and address information of the first functional unit based on the address information of the first proxy unit.

In a possible implementation, the data forwarding chip enumerates the network interface card to obtain information about a second functional unit in the network interface card, and allocates an address to the second functional unit, where the second functional unit is configured to implement a function of the network interface card, and the information about the second functional unit includes information about a second physical function (PF) and/or information about a second virtual function (VF).

The data forwarding chip receives information that is sent by a second processor and that is about a second proxy unit in the data forwarding chip, where the second proxy unit is a proxy of the second functional unit, and address information of the second proxy unit is obtained after the second processor enumerates the data forwarding chip to obtain the information about the second proxy unit in the data forwarding chip, and allocates an address to the second proxy unit.

The data forwarding chip establishes a correspondence between the address information of the second proxy unit and address information of the second functional unit based on the address information of the second proxy unit.

In a possible implementation, the method further includes:

The data forwarding chip forwards the data forwarding request between the target processor and the network interface card based on the address information of the proxy unit and the address information of the functional unit.

BRIEF DESCRIPTION OF DRAWINGS

To describe the technical solutions in embodiments of this application more clearly, the following briefly describes the accompanying drawings required for describing embodiments. It is clear that the accompanying drawings in the following description show merely some embodiments of this application, and a person of ordinary skill in the art may still derive other drawings from these accompanying drawings without creative efforts.

DESCRIPTION OF EMBODIMENTS

Figure 1:
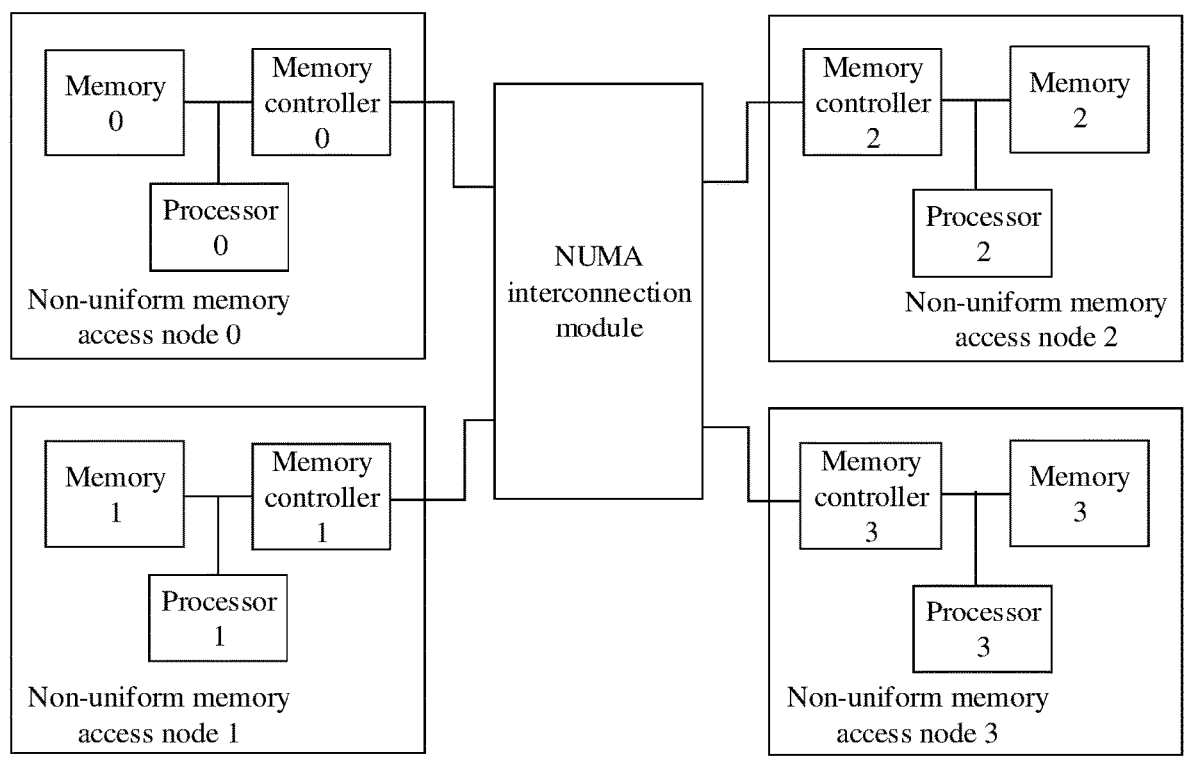
FIG. 1 is a schematic diagram of a NUMA architecture according to an embodiment of this application.

To help a person skilled in the art better understand the technical solutions in this application, some concepts in embodiments of this application are first described.

Bus device function (BDF): a unique identifier of each function in a peripheral component interface express (PCIe) device. Each PCIe device may have only one function, or may have a maximum of eight functions. Regardless of how many functions a PCIe device has, each function of the PCIe device has a unique independent configuration space. Configuration software of PCIe (for example, a root complex of PCIe) can identify a logical topology of a PCIe bus system, each bus in the PCIe bus system, and each PCIe device and each function of the PCIe device, that is, can identify the BDF. In the BDF, a bus number occupies 8 bits, a device number occupies 5 bits, and a function number occupies 3 bits.

PCIe device enumeration: A PCIe architecture usually includes a root complex, a switch, an endpoint, and another PCIe device of such a type. In addition, the root complex and the switch usually have an embedded endpoint (this device has no PCIe interface specific to the outside). After a computer system in which the PCIe device is located is started, a central processing unit (CPU) needs to identify these devices. The root complex typically uses a specific algorithm, for example, a depth-first algorithm, to access each possible branch path until no further in-depth access is possible, and each PCIe device can be accessed only once. This process is referred to as PCIe device enumeration.

Single-root input/output virtualization (SR-IOV) technology: a hardware-based virtualization solution that can improve performance and scalability. By using the SR-IOV technology, a single input/output (I/O) resource may be shared by a plurality of virtual machines, and each virtual machine (VM) can access a unique I/O resource. A PCIe device (for example, an Ethernet port) that has enabled SR-IOV and that has appropriate hardware and operating system (OS) support may be shown as a plurality of separate physical devices, and each physical device has its own PCIe configuration space. Two function types are abstracted in the technology for use by a user, which are respectively referred to as a physical function (PF) and a virtual function (VF). The PF is a full-function PCIe function and can be discovered, managed, and processed like any other PCIe device. The PF has full configuration resources and can be used to configure or control the PCIe device. The VF is a function associated with the PF, is a lightweight PCIe function, and can share one or more physical resources with the PF and other VFs associated with the same PF The VF is allowed to have only configuration resources used for its own behavior. Each device implementing SR-IOV may have one or more PFs, and each PF may have a maximum of 64,000 VFs associated with the PF. The PF may create VFs through registers, and the registers are designed with attributes specific to this purpose. Each VF has PCIe internal space for mapping its register set. A VF device driver operates the register set to enable a function of the register set, and is displayed as an actual PCIe device. Each PF or VF has a unique BDF in a PCIe bus system.

Multi-PF scenario: Physical ports of a physical network interface card can be divided into a plurality of PFs, that is, only one port is physically provided, but a plurality of independent PCIE devices, independent network ports, and independent Media Access Control (MAC) addresses, and the like can be seen in basic input/output system (BIOS) scanning and an OS. For example, an Intel XL710 network interface card supports 40 Gigabit Ethernet (GE) and provides one physical network port. A 40GE network port can be divided into four 10GE network ports. In this case, one physical port is divided into four PFs.

Transaction layer packet (TLP) packet: A PCIe bus uses a transaction when transmitting data, and this transaction is also referred to as a TLP packet. The TLP packet generally includes a header, a data segment, check information, and the like. A PCIe packet includes memory access read/write, I/O access read/write, configuration space access read/write, a message transaction, and the like.

Base address register (BAR) space address: Each PCIe device (for example, a PF or a VF) has its own internal space, and this part of internal space cannot be directly accessed by a CPU. When the CPU needs to read data from the internal space of the PF or the VF, the root complex first reads, by using a TLP packet, the data from the PF or the VF to a memory accessible by the CPU, and then the CPU reads the data from the memory accessible by the CPU. If the CPU needs to write data into the internal space of the PF or the VF, the CPU writes the data into the memory first, and then the root complex writes the data into the internal space of the PF or the VF by using a TLP packet.

Virtualization: Abstracting a resource in a form into a resource in another form is virtualization, which is essentially simulation. System virtualization means virtualizing a physical computer system (a host) into one or more VMs. Each VM has its own hardware such as a CPU, a memory, and various peripherals, and each VM can run its own OS and applications. Hardware resources owned by the VM may be resources simulated by software, or may be real physical hardware.

An application scenario of an apparatus provided in this application is first described below. As data increases exponentially, a server is generally equipped with a network interface card (NIC) and a main board that has a plurality of CPU sockets (multi-socket), and each CPU socket may be inserted with one processor. To be specific, the server includes a plurality of CPUs, and the plurality of CPUs are connected through a communication bus. However, the plurality of CPUs in the server share a network interface card, and the network interface card shared by the plurality of CPUs is connected to only one of the CPUs. When a CPU that is not directly connected to the network interface card needs to send data to a network by using the network interface card, the data needs to be transmitted to the network interface card through the communication bus between the processors. Consequently, I/O overheads of a system and a data transmission delay increase. The communication bus includes but is not limited to a quick path interconnect (QPI) bus, an ultra path interconnect (UPI) bus, an Intel accelerator link (INTEL® accelerator link, IAL) bus, and the like.

For example, the server uses a non-uniform memory access (NUMA) architecture. FIG. 1 is a schematic diagram of a NUMA architecture according to an embodiment of the present disclosure. In the NUMA architecture, hardware resources of the server are divided into a plurality of NUMA nodes, and each NUMA node includes one or more CPUs in the server, a memory, a memory controller, and the like. The CPU in each NUMA node is directly connected to the memory, and the memories in the NUMA nodes are separated from each other. The NUMA nodes can exchange information with each other, so that each CPU can access a memory of an entire computer system. A memory controller is shared inside each NUMA node, and a memory resource in the NUMA node is equivalent for all CPUs in the NUMA node. In other words, the memory in each NUMA node is a local memory for the CPU in the NUMA node, but is a remote memory for a CPU in another NUMA node. A speed of accessing a local memory by each CPU is faster than a speed of accessing a remote memory.

Figure 2:
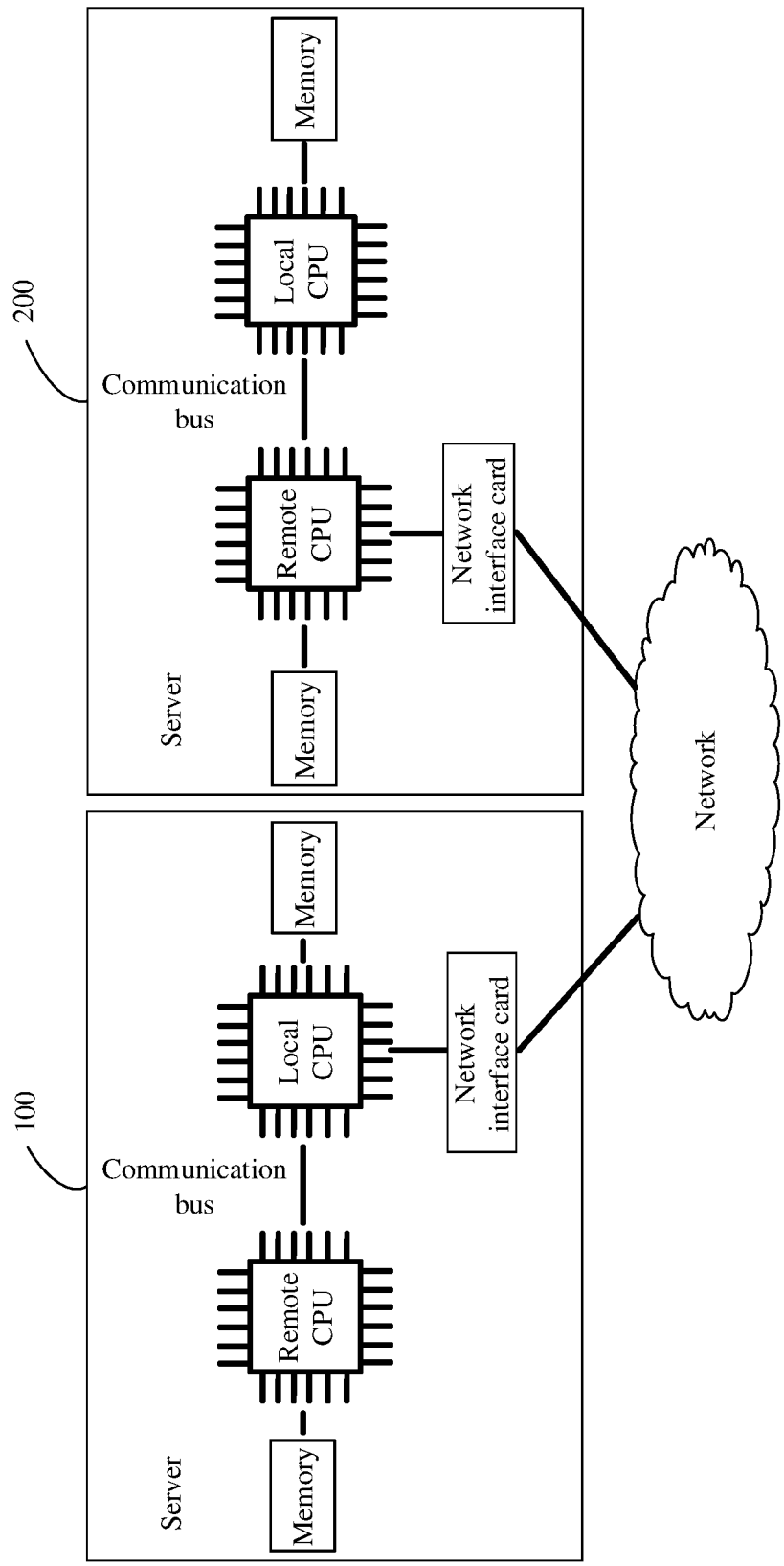
FIG. 2 is a schematic diagram of communication between multi-socket servers according to an embodiment of this application.

FIG. 2 is a schematic diagram of communication between two multi-socket servers according to an embodiment of the present disclosure. A server 100 and a server 200 each includes two sockets. If each socket serves as a NUMA node, each NUMA node includes a CPU and a corresponding memory. Two CPUs in each server share a network interface card. A network interface card of each server is in direct communication connection with one of the CPUs, a CPU directly connected to the network interface card is used as a local CPU, and the other CPU is used as a remote CPU. In the server 100, if data of an application program that is run in the remote CPU needs to be transmitted through a network, and a memory applied for by the application program is in a NUMA node in which the remote CPU is located, that is, the data of the application program is in a local memory corresponding to the remote CPU, the data of the application program needs to be transmitted to the network interface card through a communication bus between the remote CPU and the local CPU, and is then sent to the network by using the network interface card. If in the server 200 that receives the data, an application program that needs to use the data is run in the remote CPU of the server 200, and a memory applied for by the application program is a local memory corresponding to the remote CPU of the server 200, after receiving the data, the network interface card of the server 200 needs to send, through a communication bus between the CPUs, the data to the local memory corresponding to the remote CPU.

When the server sends or receives data, cross-chip transmission of the data (that is, the data needs to be transmitted to the network interface card through the communication bus between the CPUs) may occur. In this data transmission manner, a CPU usage ratio increases and a data transmission delay increases.

Figure 3:
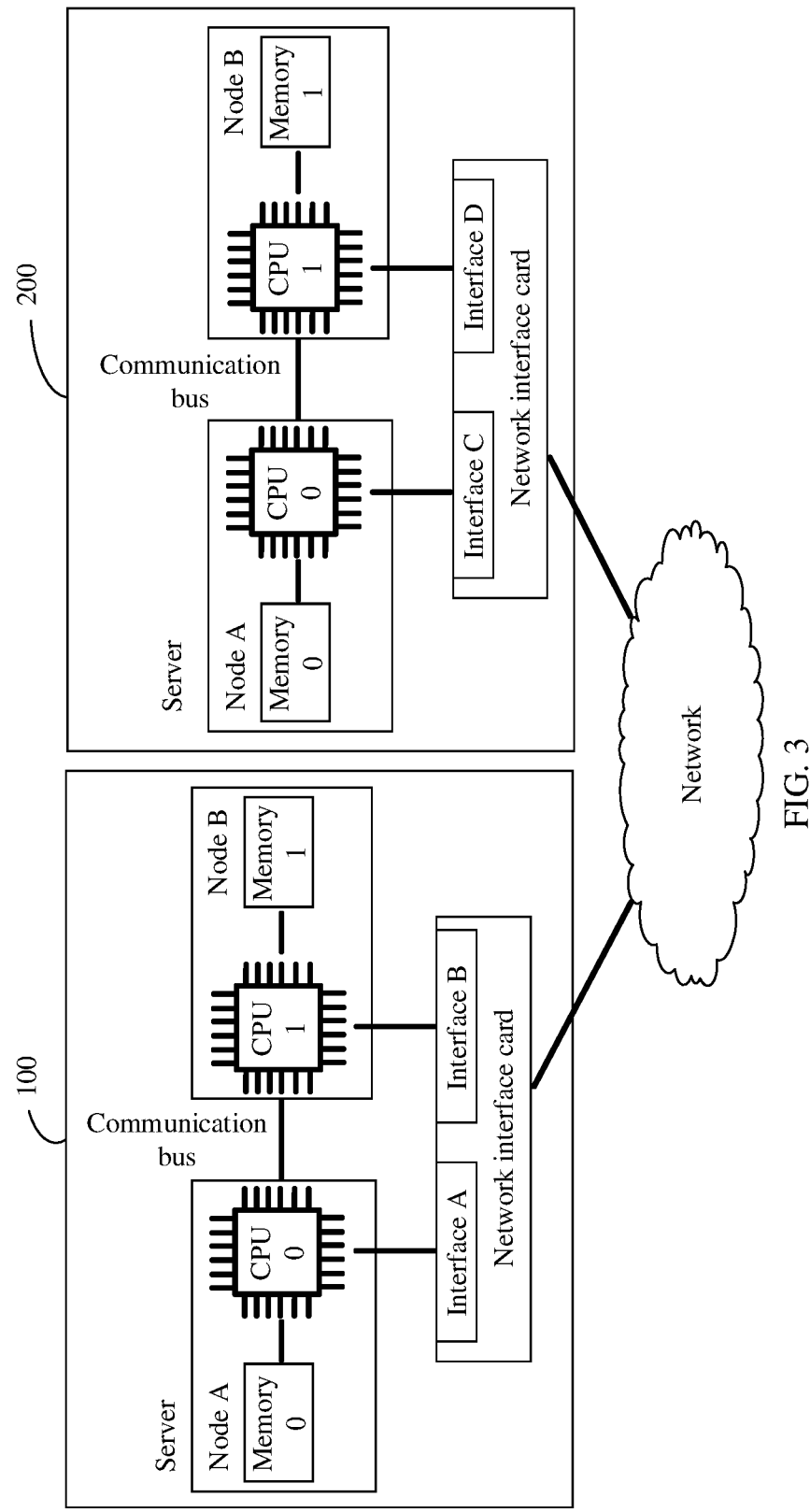
FIG. 3 is another schematic diagram of communication between multi-socket servers according to an embodiment of this application.

FIG. 3 is another schematic diagram of communication between multi-socket servers according to an embodiment of the present disclosure. In FIG. 3, a network interface card may provide a plurality of PCIe interfaces, so that each CPU in the server can be directly connected to the network interface card through a bus. For example, if a server 100 includes two CPUs, the network interface card may provide two PCIe interfaces, and each CPU can directly send data to the network interface card, so as to avoid that when the remote CPU in FIG. 1 sends data, the data needs to be transmitted to the network interface card through cross-chip transmission through the bus between the processors, and then can be finally sent to another server by the network interface card.

However, in the server shown in FIG. 3, a NUMA policy of the server needs to be manually configured, that is, the following needs to be manually set: When an application program is run, the server allocates a local memory (that is, a memory located in a same NUMA node as a CPU running the application program) to the application program to store data of the application program. In addition, when the data of the application program needs to be sent to another server, the CPU running the application program sends the data to the network interface card through an interface connecting the CPU and the network interface card. In this method, the application program needs to perceive NUMA information of the server. When being run, the application program applies for the local memory based on the perceived NUMA information. In addition, when the application program needs to send the data, the CPU running the application program can directly send the data to the network interface card, so as to avoid that the remote CPU shown in FIG. 1 needs to send the data to the network interface card through the bus between the processors.

The NUMA information includes a hardware structure and a logical architecture such as a quantity of NUMA nodes in the server, a quantity of processors in each NUMA node, a size of a memory in each NUMA node, and an address range of the memory in each NUMA node. For example, in FIG. 3, the NUMA information of the server 100 includes an address range of a memory in each NUMA node in the server and a mapping relationship between the plurality of NUMA nodes and a plurality of network interface cards, and specifically includes the following: The server 100 includes two NUMA nodes, namely, a NUMA node A and a NUMA node B; the NUMA node A includes a CPU 0 and a memory 0, and a memory address range of the memory 0; the NUMA node B includes a CPU 1 and a memory 1, and a memory address range of the memory 1; the NUMA node A is connected to an interface A of the network interface card; and the NUMA node B is connected to an interface B of the network interface card. When an application program is run in the CPU 0 in the NUMA node A, the application program applies, based on the perceived NUMA information of the server 30, for a buffer area in the local memory 0 to buffer data. When the CPU 0 needs to send the data of the application program to another server, the CPU 0 sends the data to the network interface card through the interface A of the network interface card.

However, currently, most native application programs cannot perceive NUMA information of a server. If an application program cannot perceive the NUMA information of the server, when the application program is run, an operating system allocates a memory in another NUMA node to the application program to buffer data. If a local memory corresponding to a CPU running the application program is insufficient and a remote memory needs to be allocated to buffer the data, when the data of the application program needs to be sent, the CPU needs to access the remote memory to obtain the data that is of the application program and that is in the remote memory, and then sends the data to the network interface card. Alternatively, the operating system allocates a local memory to the application program, but when sending the data of the application program, the operating system may choose to send the data to the network interface card through an interface that is in another NUMA node and that is connected to the network interface card. For example, in FIG. 3, an application program is run in the CPU 0 in the server 100, and a memory allocated by the CPU 0 to the application program is located in the memory 0 in the node A. When the CPU 0 needs to send data of the application program, the CPU 0 may choose to send the data to the network interface card through an I/O interface of the node B. In this case, cross-chip transmission of the data still needs to be performed, that is, the data needs to be transmitted from the memory 0 in the node A to the network interface card through a communication bus between the nodes and the CPU 1. As a result, using the network interface card shown in FIG. 3 still causes a problem that CPU overheads increase and a data transmission delay is long.

Figure 4:
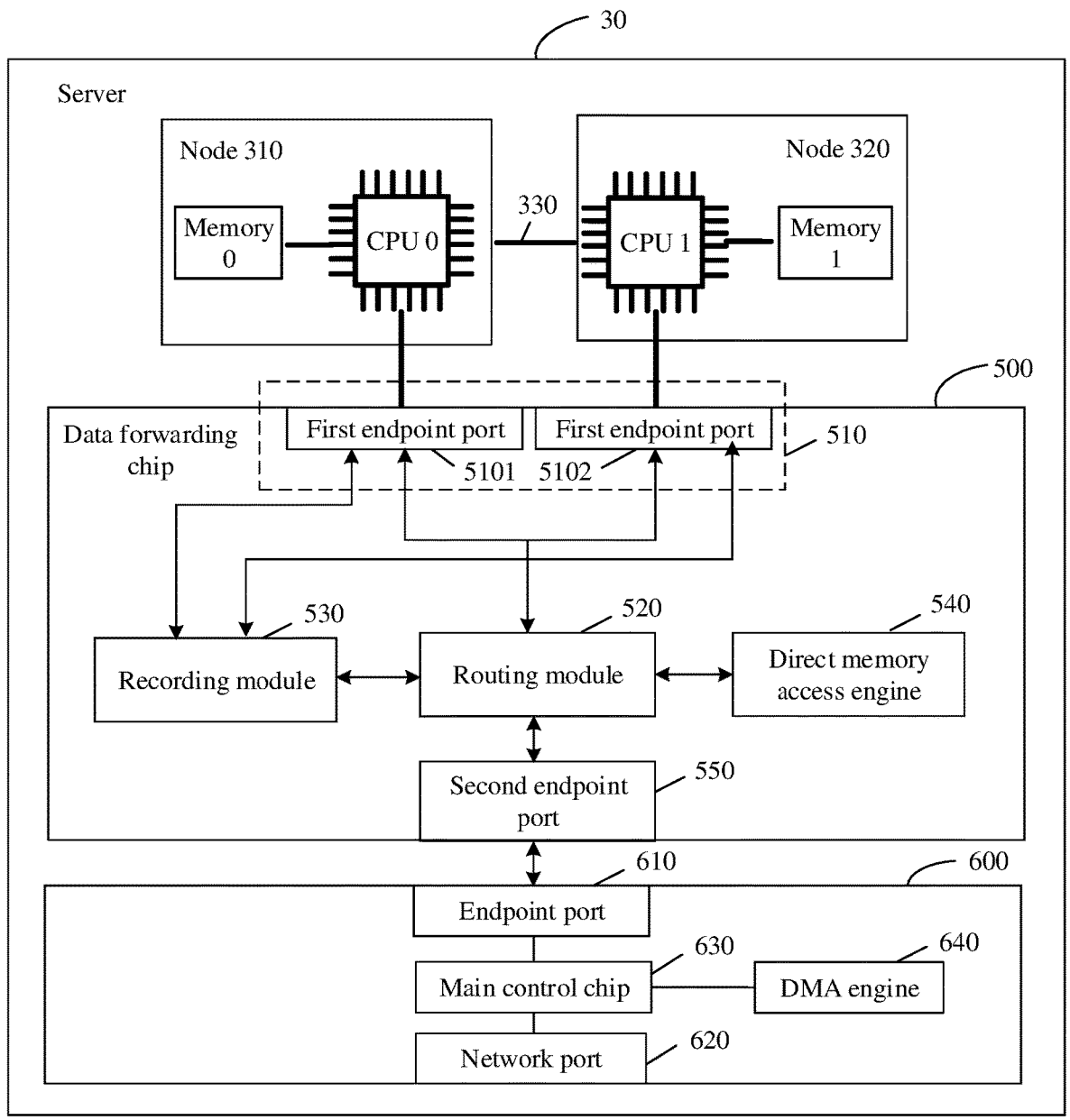
FIG. 4 is a schematic diagram of a connection between a data forwarding chip and each of a server and a network interface card according to an embodiment of this application.

To resolve a problem that when the foregoing server sends data, the data needs to reach the network interface card through cross-chip transmission, which increases CPU overheads and a data transmission delay, embodiments of this application provide a data forwarding chip. The data forwarding chip has a plurality of processors, and each processor corresponds to a memory space having a preset address range. Embodiments of this application are described by using the server having the NUMA architecture as an example. FIG. 4 is a schematic diagram of a two-path (2P) server according to an embodiment of this application. A server 30 includes a CPU 0, a CPU 1, a data forwarding chip 500, and a network interface card 600. The CPU 0 is located in a NUMA node 310, the CPU 1 is located in a NUMA node 320, and the CPU 0 and the CPU 1 are connected through a communication bus 330. The communication bus includes but is not limited to a quick path interconnect (QPI) bus, an ultra path interconnect (UPI) bus, an Intel accelerator link (IAL) bus, and the like. The CPU 0 and the CPU 1 are separately connected to the data forwarding chip 500 through a bus, and the data forwarding chip 500 and the network interface card 600 are connected through a bus. The bus includes but is not limited to a PCIe bus or a UPI bus.

The data forwarding chip 500 includes an interface module 510, a routing module 520, a recording module 530, a direct memory access (DMA) engine 540, and a second endpoint port 550. The interface module 510 includes a plurality of first endpoint ports used to connect to a socket of the server, and the plurality of first endpoint ports include at least two first endpoint ports connected to a memory space corresponding to the processor. An example in which the interface module 510 includes two first endpoint ports, namely, a first endpoint port 5101 and a first endpoint port 5102, is used in this embodiment. The first endpoint port 5101 is directly connected to the CPU 0 and a memory 0 in the NUMA node 310 through a bus, and the first endpoint port 5102 is directly connected to the CPU 1 and a memory 1 in the NUMA node 320 through a bus. The routing module 520 is configured to control the data forwarding chip 500 to perform, for example, after receiving a data sending request sent by the CPU, the data forwarding chip 500 determines, based on address information of target data that needs to be sent, a path for obtaining the target data; or when receiving data, the data forwarding chip 500 determines, based on destination address information of the received data, a path for writing the data into the memory of the server. The recording module 530 is configured to record NUMA information of the server. The DMA engine 540 is configured to read or write data, for example, reading data from the memory of the server or writing, into the memory of the server, received data sent by another server. Serving as a root port of a root complex, the second endpoint port 550 is connected to the network interface card 600 through a PCIe bus. The root complex is a root node in a PCIe topology structure, and the PCIe topology structure usually includes a host bridge, a root complex, and an internal bus. In this embodiment, the host bridge may be implemented by using the routing module 520. Certainly, the host bridge may alternatively be implemented by using another control component in the data forwarding chip 500 or another control device between the data forwarding chip 500 and the network interface card 600. This is not specifically limited in embodiments of this application.

An endpoint port 610 of the network interface card 600 is connected to the second endpoint port 550 of the data forwarding chip 500 through the PCIe bus. The network interface card 600 is connected to a network through a network port 620. The network interface card 600 further includes a main control chip 630 and a DMA engine 640. The main control chip 630 is configured to control the network interface card 600. The DMA engine 640 is configured to read or write data, for example, reading data from the data forwarding chip 500 or writing, into the data forwarding chip 500, received data sent by another server.

Figure 5:
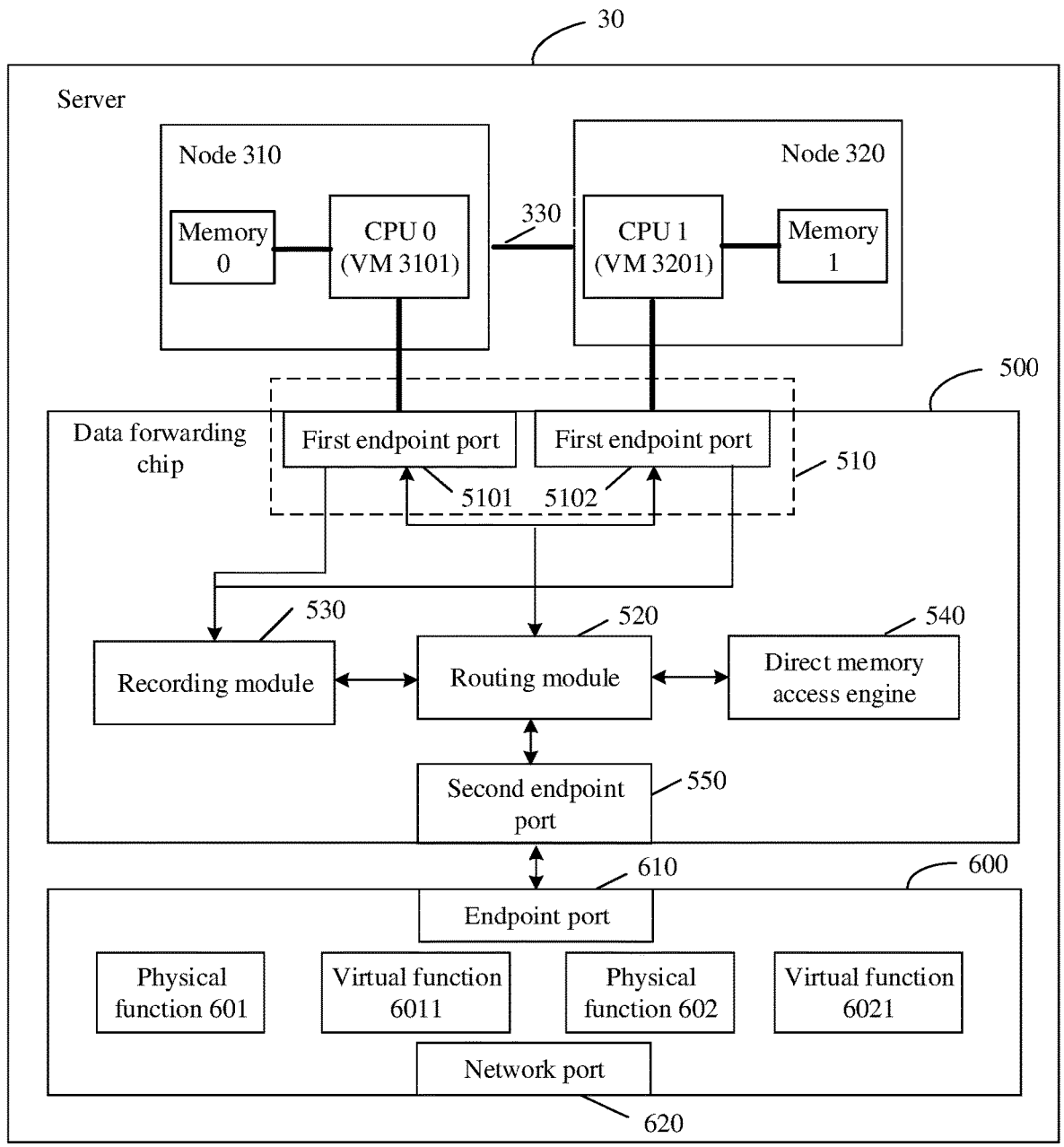
FIG. 5 is a schematic diagram of a correspondence between a data forwarding chip in an SR-IOV mode and each of a server and a network interface card according to an embodiment of this application.

In this embodiment, implementation of the server 30 in FIG. 4 is described by using an example in which both the data forwarding chip 500 and the network interface card 600 support and enable an SR-IOV technology, the CPU 0 runs a VM 3101, the CPU 2 runs a VM 3201, and the data forwarding chip 500 is implemented by using a field programmable logic gate array (FPGA). As shown in FIG. 5, the network interface card 600 includes a Physical Function (PF) 601 and a PF 602, a Virtual Function (VF) 6011 is associated with the PF 601, and a VF 6021 is associated with the PF 602.

After the data forwarding chip 500 is inserted into the server 30 to be connected to the CPU and the network interface card 600, the data forwarding chip 500 enumerates the network interface card 600 from a perspective of PCIe enumeration, to obtain PF information and VF information that are of the network interface card. In this embodiment, the routing module 520 in the data forwarding chip 500 may serve as a root node in the PCIe topology structure, and find, through PCIe enumeration, a PCIe endpoint device (namely, the network interface card 600) connected to the second endpoint port 550. For example, through PCIe enumeration, the routing module 520 finds the network interface card 600, and further finds the PF 601 and the PF 602 in the network interface card 600. The routing module 520 enables a VF Enable register in a SR-IOV configuration space of each PF to configure a VF attribute to find a VF, for example, find the VF 6011 and the VF 6021. For example, the data forwarding chip 500 finds the VF 6011 by configuring a capability of SR-IOV for the PF 601, and finds the VF 6021 by configuring a capability of SR-IOV for the PF 602.

The routing module 520 finds the PF and the VF through PCIe enumeration, allocates a corresponding BDF to each of the found PF and VF based on a location of each of the PF and the VF in the PCIe topology, and stores the allocated BDF in the recording module 530. For example, the routing module 520 stores, in the recording module 530, the BDF of the PF 601, the BDF of the VF 6011, the BDF of the PF 602, and the BDF of the VF 6021. In addition, the routing module 520 further obtains a size of a BAR space of each functional unit (for example, a PF or a VF) through enumeration, and configures a BAR space address. The VF 6011 is used as an example. The routing module 520 obtains a size of a BAR space of the VF 6011, and configures a start address and an address length of the BAR space of the VF 6011. The configured start address and address length of the BAR space of the VF 6011 are BAR space address information of the VF 6011. In a similar implementation, the routing module 520 may further obtain a BAR space address of the PF 602, a BAR space address of the PF 602, and BAR space address information of the VF 6021. After obtaining the BAR space address of each functional unit, the routing module 520 stores the BAR space address in the recording module 530.

Optionally, the recording module 530 may be an independent memory such as a random access memory (RAM) in the data forwarding chip 500, and is configured to store the BDF information and the BAR space address information. Certainly, the routing module 520 may also store the BDF information and the BAR space address information in another memory, and the another memory may be a memory outside the data forwarding chip 500. A specific location for storing the BDF information and the Bar space address information is not limited in embodiments of this application.

After the data forwarding chip 500 obtains the network interface card through enumeration and obtains the PF information and the VF information that are of the network interface card, the data forwarding chip 500 presents a PCIe device for the CPU, that is, serving as a data forwarding apparatus between the CPU and the network interface card, the data forwarding chip 500 presents as a network interface card function for the CPU. The CPU uses the chip as a network interface card device, and then performs PCIe enumeration on the data forwarding chip 500 to obtain PF information and VF information that are of the chip 500. In other words, the CPU 0 and the CPU 1 may also serve as root nodes in the PCIe topology structure, and find an endpoint device in the data forwarding chip 500 through PCIe enumeration. When the CPU 0 and the CPU 1 perform PCIe enumeration on the data forwarding chip 500, the CPU 0 finds a PF 601' through the first endpoint port 5101, and the CPU 1 finds a PF 602' through the first endpoint port 5102. Enumeration performed by the CPU 0 is used as an example. The CPU 0 reads a register at the first endpoint port 5101, where the register stores information that identifies the PF 601'; and the CPU 0 finds the PF 601' based on the information.

Information that is used to identify a PF function and that in the register at the first endpoint port of the data forwarding chip 500 may be configured when the data forwarding chip 500 is manufactured, or may be configured in the register at the first endpoint port based on the PF information and the VF information in the network interface card 600 after the routing module 520 obtains the PF information and the VF information in the network interface card 600. If the information that is used to identify the PF function and that is in the register at the first endpoint port is configured during manufacturing, a corresponding PF function needs to be configured, during manufacturing of the data forwarding chip 500, based on related information of a network interface card that may be connected.

After obtaining the information about the PF 601' in the data forwarding chip 500 through enumeration, the CPU 0 enables a VF Enable register in a SR-IOV configuration space of the PF 601' to configure a VF attribute to find a VF 6011'. For example, the CPU 0 finds the VF 6011' by configuring a capability of SR-IOV for the PF 601', and the CPU 0 allocates a corresponding BDF to each of the PF 601' and the VF 6011' based on a location of each of the PF 601' and the VF 6011' in the PCIe topology. The CPU 0 further obtains a size of a BAR space of each of the PF' and the VF' through enumeration, and configures a BAR space address. The VF 6011' is used as an example. The CPU 0 obtains a size of a BAR space of the VF 6011', and configures a start address and an address length of the BAR space of the VF 6011'. The configured start address and address length of the BAR space of the VF 6011' are BAR space address information of the VF 6011'.

After completing enumeration, the CPU 0 sends, to the data forwarding chip 500 by using a TLP packet, the BDF information and the BAR space address information that are of the PF 601' and the BDF information and the BAR space address information that are of the VF 6011'. The routing module 520 establishes, based on the information sent by the CPU 0, a correspondence between the BDF of the PF 601' and the BDF of the PF 601 and a correspondence between the BDF of the VF 6011' and the BDF of the VF 6011, and stores the established correspondence in the recording module 530. In addition, the routing module 520 establishes a correspondence between the BAR space address of the PF 601' and the BAR space address of the PF 601 and a correspondence between the BAR space address of the VF 6011' and the BAR space address of the VF 6011, and stores the established correspondence in the recording module 530.

Through enumeration of the data forwarding chip 500 by the CPU 0, the PF 601' may be considered as a proxy that is of the PF 601 and that is in the data forwarding chip 500, or the PF 601' is a virtual PF that is in the data forwarding chip 500 and that corresponds to the PF 601; and the VF 6011' may be considered as a proxy that is of the VF 6011 and that is in the data forwarding chip 500, or the VF 6011' is a virtual VF that is in the data forwarding chip 500 and that corresponds to the VF 6011. The CPU 0 finds, through enumeration, that the data forwarding chip 500 has a function of a PF (the PF 601') and a function of a VF (the VF 6011'). The data forwarding chip 500 may be used as a network interface card on a PCIe link, and a data packet or a command packet may be forwarded by using the data forwarding chip 500. The data forwarding chip 500 further forwards the received data packet or command packet between the data forwarding chip 500 and the network interface card 600 based on the stored correspondence.

It can be understood that a process in which the CPU 1 enumerates the data forwarding chip 500 is similar to the process in which the CPU 0 enumerates the data forwarding chip 500. For example, when the CPU 1 severs as a root node in the PCIe topology structure to perform PCIe enumeration, the CPU 1 finds the PF 602' and configures a VF 6021'. After completing enumeration, the CPU 1 sends, to the routing module 520 by using a TLP packet, BDF information and BAR space address information that are of the PF 602' and BDF information and BAR space address information that are of the VF 6021'. The routing module 520 stores, in the recording module 530, a correspondence between a BDF of the PF 602' and a BDF of the PF 602 and a correspondence between a BDF of the VF 6021' and a BDF of the VF 6021. In addition, the routing module 520 stores, in the recording module 530, a correspondence between a BAR space address of the PF 602' and a BAR space address of the PF 602 and a correspondence between a BAR space address of the VF 6021' and a BAR space address of the VF 6021.

After the two CPUs in the server 30 separately obtain the data forwarding chip 500 through enumeration, the server loads a driver of the data forwarding chip 500. The driver includes code for querying the NUMA information of the server. After the server 30 loads the driver of the data forwarding chip 500, the CPU 0 or the CPU 1 obtains the NUMA information of the server 30 by running the driver, and sends the obtained NUMA information to the data forwarding chip 500 through the first endpoint port 5101 or the first endpoint port 5102. The NUMA information of the server 30 includes a size of a memory corresponding to each of the NUMA node 310 and the NUMA node 320, an address range corresponding to the memory, and information about an endpoint port connected to each NUMA node. After receiving the NUMA information through the first endpoint port 5101 or the first endpoint port 5102, the routing module 520 sends the NUMA information to the recording module 530 for recording. In addition, the recording module 530 may store a correspondence between a PF' and a PF and a correspondence between a VF' and a VF, for example, the correspondence between the BDF of the PF 601' and the BDF of the PF 601, the correspondence between the BDF of the VF 6011' and the BDF of the VF 6011, the correspondence between the BAR space address of the PF 601' and the BAR space address of the PF 601, and the correspondence between the BAR space address of the VF 6011' and the BAR space address of the VF 6011; and the correspondence between the BDF of the PF 602' and the BDF of the PF 602, the correspondence between the BDF of the VF 6021' and the BDF of the VF 6021, the correspondence between the BAR space address of the PF 602' and the BAR space address of the PF 602, and the correspondence between the BAR space address of the VF 6021' and the BAR space address of the VF 6021.

It should be noted that to clearly display a composition of the data forwarding chip 500 and a connection relationship between the data forwarding chip 500 and each of the CPU and the network interface card, proxy units in the data forwarding chip 500 such as the PF 601', the VF 6011', the PF 602', and the VF 6021' are not displayed in the figure. The proxy unit mentioned in another embodiment of this application is no longer displayed in a corresponding data forwarding chip.

It can be understood that in the foregoing embodiment, that a network interface card supports two PFs and each PF is associated with a VF is used as an example to describe the technical solution provided in this embodiment. In specific implementations, one network interface card may support a plurality of PFs, and each PF may be associated with a plurality of VFs. For example, if the PF 601 is associated with 64 VFs (a VF 0 to a VF 63), the PF 601' in the data forwarding chip 500 is associated with 64 VFs' (a VF 0' to a VF 63'), where the VF 0 to the VF 63 are in a one-to-one correspondence with the VF 0' to the VF 63'. If one VF corresponds to one virtual machine (VM) in a CPU, for example, 64 VMs (a VM 0 to a VM 63) are run in the CPU 0, the VF 0' to the VF 63' that are associated with the PF 601' are in a one-to-one correspondence with the VM 0 to the VM 63 that are run in the CPU 0, to forward a data packet or a command packet between the VM 0 to the VM 63. Similarly, 64 VMs (a VM 64 to a VM 127) are run in the CPU 1, and a VF 64' to a VF 127' that are associated with the PF 602' are in a one-to-one correspondence with the VM 64 to the VM 127 that are run in the CPU 1, to forward a data packet or a command packet between the VM 64 to the VM 127.

Figure 6:
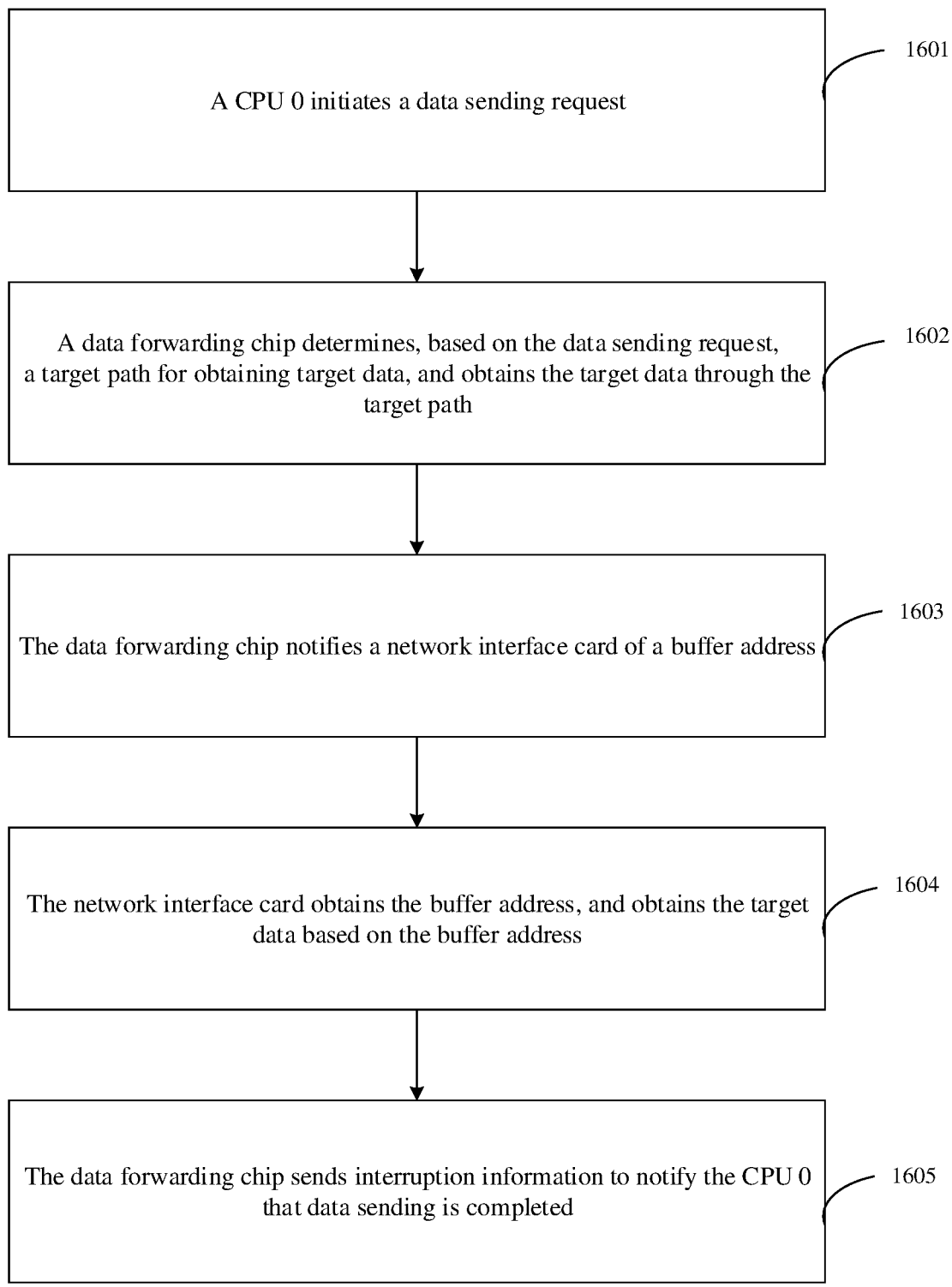
FIG. 6 is a schematic flowchart of a method for sending data by a server according to an embodiment of this application.

A method in which a data forwarding chip forwards data between a CPU and a network interface card is described below by separately using an example in which a server sends data and an example in which a server receives data. FIG. 6 is a schematic flowchart of a method for sending data by a server according to an embodiment of this application. The method includes the following steps.

1601. The CPU 0 initiates a data sending request.

The server shown in FIG. 5 is used as an example. An application program that is run in the CPU 0 in the server 30 needs to send target data. For example, the application program is run in a VM 9 in the CPU 0. After initiating the data sending request to the data forwarding chip 500 by running a driver corresponding to the VM 9, and encapsulating the data sending request as a corresponding descriptor, the CPU 0 writes, into a doorbell (DB) register, a pointer corresponding to the descriptor, and notifies the routing module 520 in the data forwarding chip 500. The pointer indicates location information of the descriptor, and the descriptor includes a source address of the target data, a type of the target data, a length of the target data, and the like.

1602. The data forwarding chip 500 determines, based on the data sending request, a target path for obtaining the target data, and obtains the target data through the target path.

The routing module 520 obtains, based on the pointer through the first endpoint port 5101, the descriptor from a queue corresponding to the CPU 0, obtains the source address that is of the target data and that is in the descriptor, and obtains the stored NUMA information of the server 30 from the recording module 530. Then, the routing module 520 determines, based on the source address that is of the target data and that is in the descriptor, that the target data is located in a target NUMA node in the plurality of NUMA nodes in the server; determines, based on the NUMA information of the server 30, a target endpoint port connected to the target NUMA node, and further determines that a path for obtaining the target data through the target endpoint port is a shortest path; and finally obtains the target data in a memory space of the server 30 from the shortest path by using the DMA engine 540, and stores the target data in a buffer of the data forwarding chip 500.

For example, an application program is running in the CPU 0 in the server 30, and a memory space applied for by the application program is a local memory, that is, data of the application program is stored in the memory 0. When the application program needs to send target data, the CPU 0 encapsulates the data sending request as a corresponding descriptor by using a driver of the chip, writes the descriptor into a submission queue (SQ), and instructs, by writing the descriptor into the DB register, the routing module 520 of the data forwarding chip 500 to obtain the descriptor from the SQ corresponding to the CPU 0. Alternatively, the CPU 0 in the server 30 converts the data sending request into a communication packet between processors, and sends the communication packet to the CPU 1. After parsing the communication packet to obtain the data sending request, and encapsulating the data sending request as a corresponding descriptor, the CPU 1 writes the descriptor into an SQ queue in a memory corresponding to the CPU 1, and the CPU 1 instructs, by writing the descriptor into the DB register, the routing module of the chip 500 to obtain the descriptor from the corresponding SQ queue of the CPU 1.

In this embodiment, a process of obtaining the target data by the data forwarding chip 500 is described by using an example in which the CPU 0 sends the data sending request to the CPU 1 and the CPU 1 notifies the data forwarding chip 500. The routing module 520 of the data forwarding chip 500 obtains, through the first endpoint port 5102, the descriptor from the SQ corresponding to the CPU 1; determines, based on the source address that is of the target data and that is in the descriptor, that the target data is located in the memory 0; and determines, based on the NUMA information of the server 30 that is obtained from the recording module 530, that the memory 0 is located in the NUMA node 310. The first endpoint port 5101 of the data forwarding chip 500 is connected to the NUMA node 310, and therefore the routing module 520 determines that a path for reading the target data through a path "the first endpoint port 5101→the memory 0" is a shortest path. Further, the DMA engine 540 initiates a DMA reading request to the CPU 0 through the first endpoint port 5101, and reads the target data into the buffer of the data forwarding chip 500 through a path "the memory 0→the first endpoint port 5101".

1603. The data forwarding chip 500 notifies the network interface card 600 of a buffer address.

The buffer address is an address that is in the data forwarding chip 500 and that is used to buffer the target data. After the DMA engine reads the target data into the buffer of the data forwarding chip 500, the routing module 520 encapsulates the buffer address of the target data as a descriptor, writes the descriptor into an SQ queue of the data forwarding chip 500, and then notifies, by writing the descriptor into the DB register, the main control chip 630 of the network interface card 600 of a pointer corresponding to the descriptor.

1604. The network interface card 600 obtains the buffer address, and obtains the target data based on the buffer address.

After the main control chip 630 of the network interface card 600 obtains the descriptor in the SQ queue of the data forwarding chip 500, the network interface card 600 sends a DMA reading request to the routing module 520 of the data forwarding chip 500 by using the DMA engine 640, reads the target data from the buffer address of the data forwarding chip, and buffers the target data into a sending queue and then sends the target data to a network.

1605. The data forwarding chip sends interruption information to notify the CPU 0 that data sending is completed.

After sending the target data, the DMA engine 640 of the network interface card 600 sends interruption information to the routing module 520 of the data forwarding chip 500 to notify the routing module 520 that data sending is completed. After receiving the information indicating that the target data is sent, the routing module 520 sends interruption information to the CPU 0 through the first endpoint port 5101 in the shortest path to notify the CPU 0 that data sending is completed.

In the process in which the data forwarding chip 500 forwards data between the CPU 0 and the network interface card 600, the data forwarding chip 500 reads the target data into the buffer of the data forwarding chip, and then notifies the network interface card 600 of the buffer address that is of the target data and that is in the data forwarding chip 500. Then the network interface card 600 reads the target data from the buffer of the data forwarding chip 500. Optionally, after the data forwarding chip 500 determines the shortest path for reading the target data from the memory, the data forwarding chip 500 does not read the target data from the memory, but sends address information of the target data to the network interface card 600, and the network interface card 600 initiates a reading request to the CPU 0. After receiving the reading request of the network interface card, the data forwarding chip 500 sends the reading request to the CPU 0 through the determined shortest path, and the network interface card 600 reads the target data from the memory through the shortest path.

Figure 7:
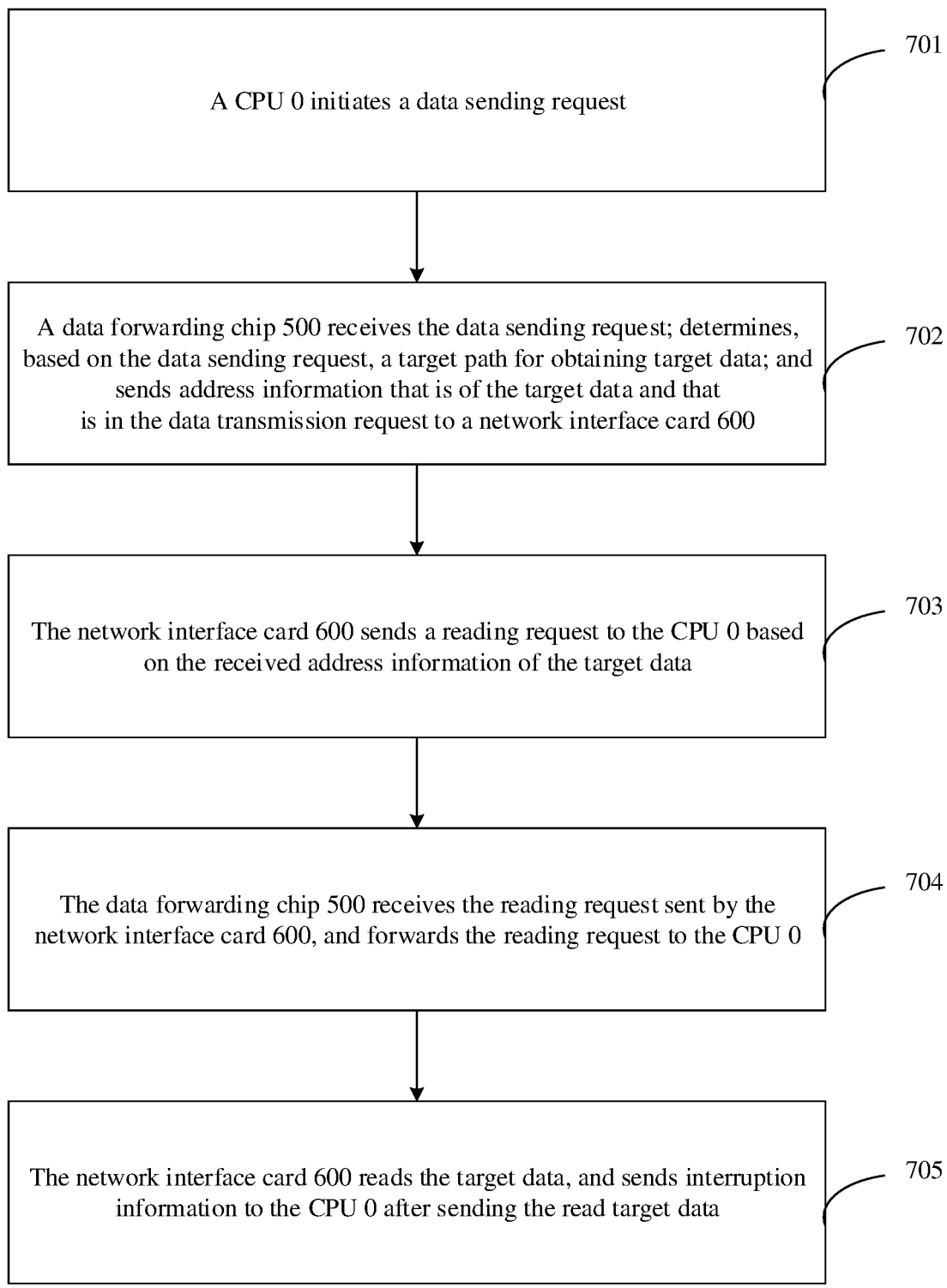
FIG. 7 is a schematic flowchart of another method for sending data by a server according to an embodiment of this application.

In a specific implementation, the process in which the data forwarding chip 500 forwards data between the CPU 0 and the network interface card 600 is shown in FIG. 7, and includes the following steps.

701. The CPU 0 initiates a data sending request.

For a manner of initiating the data sending request by the CPU 0, refer to the detailed description in step 1601. In this embodiment, in addition to notifying the data forwarding chip 500 of the address information of the target data, the CPU 0 further sends, to the data forwarding chip 500, BDF information and BAR space address information that are of a VP corresponding to a VM that initiates the data sending request.

702. The data forwarding chip 500 receives the data sending request; determines, based on the data sending request, a target path for obtaining the target data; and sends the address information that is of the target data and that is in the data sending request to the network interface card 600.

The data forwarding chip 500 receives the data sending request through the first endpoint port 5101. For a process in which the routing module 520 of the data forwarding chip 500 determines the target path based on the data sending request, refer to the description in step 1602.

After receiving the data sending request, the routing module 520 of the data forwarding chip 500 parses the data sending request to obtain a source address that is of the target data and that is in the data sending request, and then sends the source address of the target data to the network interface card 600. When the routing module 520 sends the source address of the target data to the network interface card, because the routing module 520 receives the data sending request through the first endpoint port 5101, and the CPU 0 obtains the PF 601' through enumeration through the first endpoint port 5101, and the PF 601' corresponds to the PF 601 in the network interface card 600, the routing module 520 sends the address information of the target data to any VF associated with the PF 601 or the PF 601'. For example, if the data sending request is sent by a VM 1 in the CPU 0, and a VF that corresponds to the VM 1 and that is in the network interface card is a VF 1, the routing module 520 sends the address information of the target data to the VF 1 in the network interface card 600.

703. The network interface card 600 sends a reading request to the CPU 0 based on the received address information of the target data.

After receiving the source address of the target data, a PF or a VF of the network interface card 600 initiates the reading request to the CPU 0 by using the DMA engine 640. The reading request carries source address information of the target data.

704. The data forwarding chip 500 receives the reading request sent by the network interface card 600, and forwards the reading request to the CPU 0.

It can be understood that because the CPU 0 and the CPU 1 are directly connected to the data forwarding chip 500, and the CPU 0 and the CPU 1 obtain a proxy unit PF' or VF' in the data forwarding chip 500 through enumeration, the CPU 0 and the CPU 1 can identify only information sent by a proxy unit in the data forwarding chip 500. Therefore, after receiving the reading request, the routing module 520 of the data forwarding chip 500 needs to add BDF information and BAR space address information that are of a PF' or a VF' to the reading request. The BDF information and the BAR space address information of the PF' or the VF' that are added to the reading request are BDF information and BAR space address information that are of a PF' or a VF' corresponding to an endpoint port that receives the data sending request, and the PF' or the VF' corresponding to the endpoint port is a PF' or a VF' that is obtained through enumeration by the CPU through the endpoint port. Alternatively, when the reading request includes BDF information and BAR space address information that are of a PF or a VF that receives the address information of the target data, the routing module 520 replaces the BDF information and the BAR space address information that are of the PF or the VF with BDF information and BAR space address information that are of a corresponding PF' or VF'.

For example, if the routing module 520 of the data forwarding chip 500 receives, through the first endpoint port 5101, the data sending request sent by the CPU 0, because the CPU 0 obtains the PF 601' through enumeration through the first endpoint port 5101, when receiving the reading request corresponding to the data sending request, the routing module 520 adds BDF information and BAR space address information that are of the PF 601' to the reading request, and then sends a modified reading request to the CPU 0 through the first endpoint port 5101. For another example, after the routing module 520 sends the source address of the target data to the VF 1 in the network interface card 600 in step 702, if the reading request sent by the DMA engine 640 includes BDF information and BAR space address information that correspond to the VF 1, after receiving the reading request, the routing module 520 replaces the BDF information and the BAR space address information corresponding to the VF 1 that are in the reading request with BDF information and BAR space address information that are of a VF 1' or the BDF information and the BAR space address information that are of the PF 601'. After performing the foregoing modification on the received reading request, the routing module 520 sends a modified reading request to the CPU 0 through the determined target path.

705. The network interface card 600 reads the target data, and sends interruption information to the CPU 0 after sending the read target data.

After reading the target data from the memory through the target path and sending the target data, the DMA engine 640 of the network interface card 600 sends interruption information to the routing module 520 of the data forwarding chip 500. After receiving the interruption information, the routing module 520 forwards the interruption information to the CPU 0 through the first endpoint port 5101 in the target path, to notify the CPU 0 that the target data is sent.

When the server 30 receives data, after the network interface card 600 receives a data packet sent by the network, the DMA engine 640 of the network interface card 600 sends a DMA writing request to the routing module 520 of the data forwarding chip 500, and sends the data packet to the data forwarding chip 500 for buffering. When the driver of the data forwarding chip 500 is successfully registered, the driver of the data forwarding chip 500 applies to the server for a target buffer used to buffer the data packet received by the network interface card 600. The recording module 530 of the data forwarding chip 500 stores a destination address of the target buffer, or the network interface card 600 sends the destination address of the target buffer to the routing module 520 together with the data packet. After the data forwarding chip 500 receives the data packet, the routing module 520 determines, based on the destination address of the target buffer, that the target buffer belongs to the memory 0; and determines, based on the NUMA information that is of the server 30 and that is recorded in the recording module 530, that the memory 0 is located in the NUMA node 310. The first endpoint port 5101 of the data forwarding chip 500 is connected to the NUMA node 310, and therefore the routing module 520 determines that a path for sending the data packet to the target buffer through a path "the first endpoint port 5101→the memory 0" is a shortest path. The DMA engine 540 of the data forwarding chip 500 initiates a DMA writing request to the CPU 0 through the first endpoint port 5101, and further moves the data packet to the target buffer in the memory 0 based on the foregoing path.

After receiving a data packet sent by another server, the network interface card 600 may buffer the data packet in a buffer of the network interface card 600. The DMA engine 640 of the network interface card 600 sends a writing request to the routing module 520 of the data forwarding chip 500, where the writing request includes the destination address of the target buffer. After receiving the writing request, the routing module 520 determines, based on the destination address that is of the target buffer and that is recorded in the recording module 530, that the target buffer belongs to the memory 0; and determines, based on the NUMA information that is of the server 30 and that is recorded in the recording module 530, that the memory 0 is located in the NUMA node 310. The first endpoint port 5101 of the data forwarding chip 500 is connected to the NUMA node 310, and therefore the routing module 520 determines that a path for sending the data packet to the target buffer through a path "the first endpoint port 5101→the memory 0" is a shortest path. Then, the routing module 520 forwards the writing request to the CPU 0, and the DMA engine 640 of the network interface card 600 further writes the writing request into the target buffer through the shortest path. For a manner in which the routing module forwards the writing request to the CPU 0, refer to the manner of sending the reading request to the CPU 0 in step 704.

In this embodiment, the data forwarding chip may be implemented by using a field programmable logic gate array (FPGA), or may be implemented by using an application-specific integrated circuit (ASIC) chip. This is not specifically limited in embodiments of this application. It can be understood that when the data forwarding chip is an FPGA chip, because the FPGA chip has a memory, when reading data from the memory of the server or receiving data sent by another server, the data forwarding chip 500 may buffer the read data or the received data in the memory of the FPGA. When the data forwarding chip is an ASIC chip, because the ASIC chip has no memory, the data forwarding chip 500 needs to be connected to an external memory, and buffers read data or received data in the external memory.

Figure 8:
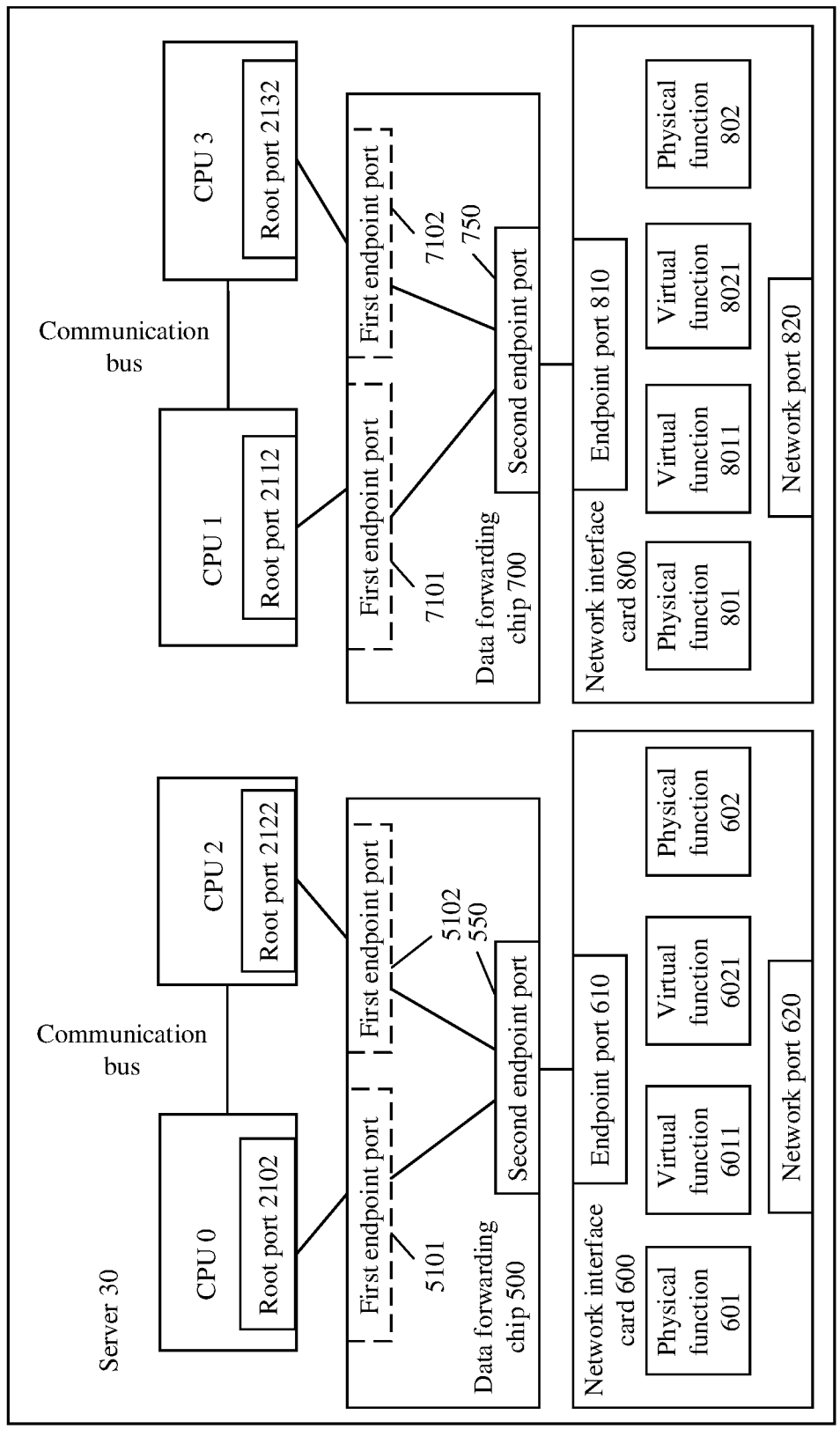
FIG. 8 is a schematic diagram of a connection between a data forwarding chip and each of a 4P server and a network interface card according to an embodiment of this application.

For example, the server in FIG. 4 is a 2P server. In a specific implementation, the server may include two or more CPUs. For example, the server may alternatively be a 4P or 8P server, and every two CPUs are connected to a network interface card by using a data forwarding chip. As shown in FIG. 8, when the server is a 4P server, the server 30 includes a CPU 0, a CPU 1, a CPU 2, and a CPU 3. The CPU 0 and the CPU 2 are connected to the network interface card 600 by using the data forwarding chip 500, and the CPU 1 and the CPU 3 are connected to a network interface card 800 by using a data forwarding chip 700. An implementation of the data forwarding chip 700 is the same as the implementation of the data forwarding chip 500.

In a possible implementation, the data packet is data required by an application program that is run on the server 30. When being run, the application program applies to the processor for a buffer. If the buffer that is applied for by the application program and that is used to store the data packet is different from the target buffer applied for by the driver of the data forwarding chip, after the DMA engine 540 sends the data packet to the target buffer applied for by the driver of the data forwarding chip, the data packet is copied from the target buffer to the buffer applied for by the application. If the target buffer and the buffer applied for by the application program are located in different NUMA nodes, when the data packet is copied from the target buffer to the buffer applied for by the application program, cross-chip transmission of the data packet needs to be performed. In this embodiment, it is specified, through configuration, that when an application program needs to receive data, a buffer applied for by the application program and the target buffer applied for by the driver of the data forwarding chip are located in a same NUMA node, to prevent cross-chip transmission of the data packet.

The data forwarding chip obtains and records memory distribution information of the server and a mapping relationship, in the server, with an interface of the data forwarding chip, so that when a server with a plurality of processors and a plurality of memories (for example, a server using a NUMA architecture) sends or receives data, the data forwarding chip may determine, based on a destination address of target data that needs to be sent, the memory distribution information in the server, and the mapping relationship, a shortest path for obtaining the target data; and reads the target data through the determined shortest path. Alternatively, when receiving data sent by another server, the data forwarding chip determines, based on a destination address allocated by the server to the received data, the memory distribution information, and the mapping relationship, a shortest path for sending the received data to a target address. Therefore, an application program does not need to perceive the memory distribution information, that is, it can be avoided that when the server sends or receives data, cross-chip transmission of data between processors occurs, thereby reducing a data transmission delay, reducing processor overheads, and improving processor utilization.

Figure 9:
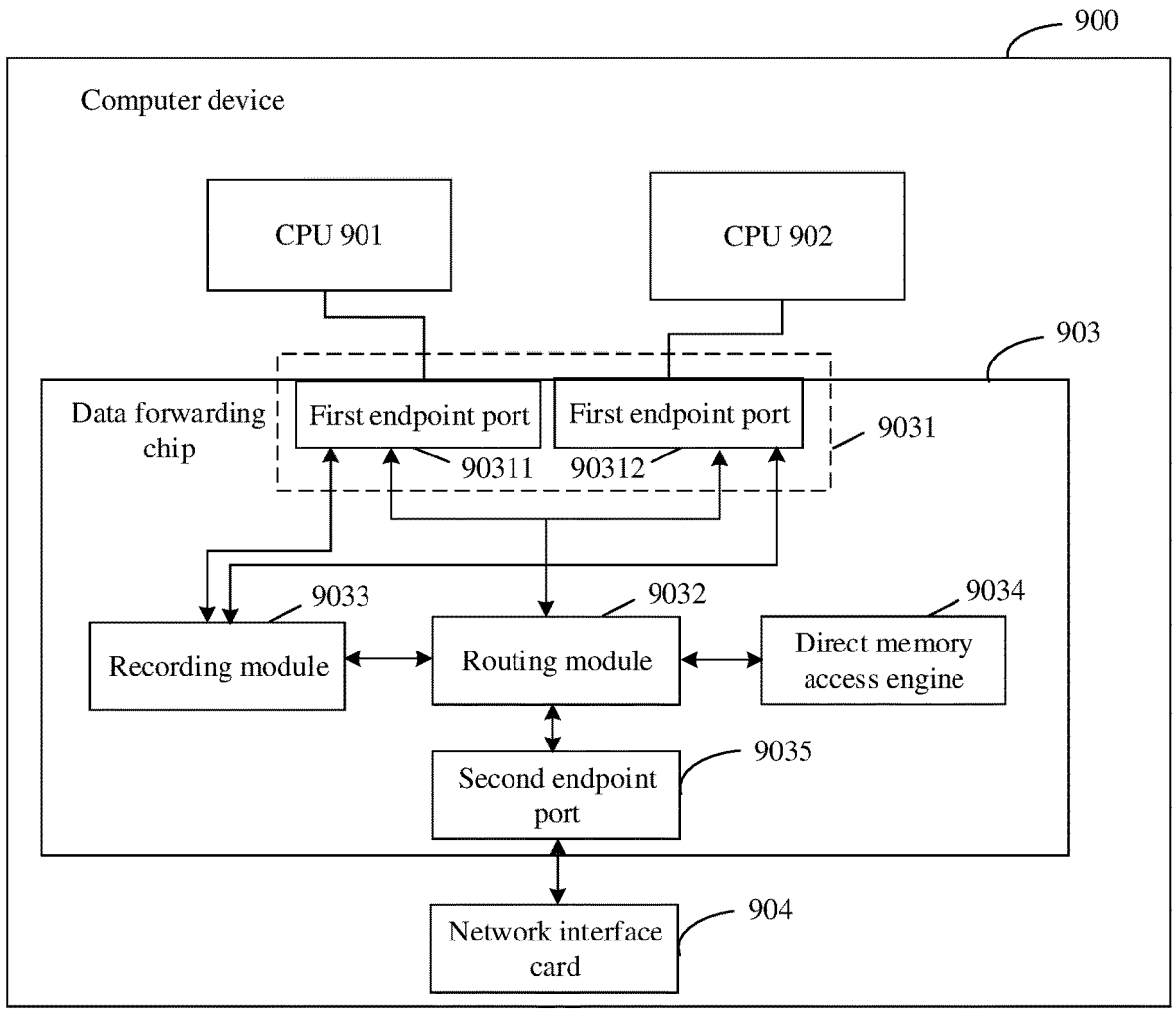
FIG. 9 is a schematic diagram of a structure of a computer device according to an embodiment of this application.

FIG. 9 is a schematic diagram of a structure of a computer device 900 according to an embodiment of this application. As shown in FIG. 9, the computer device includes a CPU 901, a CPU 902, a data forwarding chip 903, and a network interface card 904. The data forwarding chip 903 is separately connected to the CPU 901, the CPU 902, and the network interface card 904 through a bus, and the network interface card 904 includes a plurality of functional units generated by using a virtualization technology. For example, the network interface card 904 includes a plurality of PFs or VFs generated based on an SR-IOV virtualization technology.

The data forwarding chip 903 is configured to: obtain information about a first functional unit and information about a second functional unit in the network interface card 904, and allocate an address to each of the first functional unit and the second functional unit. Both the first functional unit and the second functional unit are configured to implement a function of the network interface card 904.

The CPU 901 and the CPU 902 respectively obtain information about a first proxy unit and information about a second proxy unit in the data forwarding chip 903, respectively allocate addresses to the first proxy unit and the second proxy unit, and respectively send address information of the first proxy unit and address information of the second proxy unit to the data forwarding chip 903. The first proxy unit is a proxy of the first functional unit, and the second proxy unit is a proxy of the second functional unit.

The data forwarding chip 903 is further configured to: establish, based on the address information of the first proxy unit and the address information of the second proxy unit, a correspondence between the address information of the first proxy unit and address information of the first functional unit and a correspondence between the address information of the second proxy unit and address information of the second functional unit; and forward a packet between the CPU 901 or the CPU 902 and the network interface card 904 based on the correspondence.

In a specific implementation, the CPU 901 or CPU 902 is configured to send a data sending request to the data forwarding chip 903. The data sending request indicates the data forwarding chip 903 to obtain, from a memory of the computer device 900, target data that needs to be sent by the computer device.

The data forwarding chip 903 is configured to: obtain the data sending request sent by the CPU 901 or CPU 902; determine, based on a target address in the data sending request, a shortest path for obtaining the target data; obtain the target data through the determined shortest path; and send the obtained target data to the network interface card 904.

The network interface card 904 is configured to: after receiving the target data sent by the data forwarding chip, send the target data to a network.

In a specific implementation, the network interface card 904 is further configured to: receive a data packet sent by another computer device through a network, and send the data packet to the data forwarding chip 903. The data forwarding chip 903 is further configured to: determine, based on a target address of a buffer space allocated by the server to the data packet received by the network interface card 904, a shortest path for writing the data packet into the target address; and send the data packet to the target address through the determined shortest path.

Specifically, for a method in which the data forwarding chip 903 of the computer device 900 finds the first functional unit and the second functional unit of the network interface card 904, and a method for reading data from a memory space through a shortest path or sending data to a memory space through a shortest path, refer to the description of the data forwarding chip 903 in the foregoing embodiment. For a method in which the CPU 901 or the CPU 902 finds the first proxy unit and the second proxy unit of the data forwarding chip 903, refer to the enumeration process of the CPU 0 in the foregoing embodiment.

In a specific implementation, the server uses a NUMA architecture. After loading a driver of the data forwarding chip 903, the CPU runs the driver of the data forwarding chip 903 to obtain NUMA information of the server, and sends the NUMA information of the server to the data forwarding chip 903. After receiving the data sending request, the data forwarding chip 903 determines, based on the target address in the data sending request, that the target data is located in a target NUMA node in a plurality of NUMA nodes in the server; determines, based on the NUMA information of the server 900, a target endpoint port connected to the target NUMA node, and further determines that a path for obtaining the target data through the target endpoint port is a shortest path; and finally obtains the target data in the memory space of the server 900 through the shortest path. The data forwarding chip 903 determines the shortest path for obtaining the target data, obtains the target data through the determined shortest path, and sends the target data to the network interface card 904.

In this embodiment, the data forwarding chip 903 includes an interface module 9031, a routing module 9032, a recording module 9033, a DMA engine module 9034, and a second endpoint port 9035. The interface module 9031 includes a first endpoint port 90311 and a first endpoint port 90312, the data forwarding chip 903 is connected to the CPU 901 through the first endpoint port 90311, and is connected to the CPU 902 through the first endpoint port 90312.

The routing module 9032 is configured to: obtain information about a first functional unit in the network interface card 904, allocate an address to the first functional unit, obtain address information of a first proxy unit, and establish a correspondence between the address information of the first proxy unit and address information of the first functional unit. The first functional unit is a unit generated in the network interface card 904 based on a virtualization technology, and the first proxy unit is a proxy of the first functional unit.

The recording module 9033 is configured to store the correspondence between the address information of the first proxy unit and the address information of the first functional unit.

The routing module 9032 is further configured to forward a packet, such as a data packet or a command packet, between the CPU 901 and the network interface card based on the correspondence between the address information of the first proxy unit and the address information of the first functional unit.

The data forwarding chip 903 is further configured to: obtain the data sending request sent by the CPU 901 or CPU 902; determine, based on an address in the data sending request, a shortest path for obtaining target data; obtain the target data through the determined shortest path; and then send the obtained target data to the network interface card 904.

For a specific implementation of the data forwarding chip 903, refer to the description related to the data forwarding chip 500 in FIG. 4 or FIG. 5.

It should be understood that the structure of the chip or the server described in the foregoing embodiment is merely an example. The foregoing described function of the chip or the server may be implemented in another manner. For example, the structure of the data forwarding chip is merely logical function division, and in an actual implementation, there may be another division manner. In addition, in embodiments of this application, functional chips may be integrated into one module, or each chip may exist separately. The foregoing description of embodiments of this application describes principles of the chip and the server that are provided in this application by using a specific example. The foregoing embodiments are merely used to help understand a core idea of this application. A person skilled in the art may change a specific implementation and an application scope based on the idea of this application. In conclusion, content of this specification should not be construed as a limitation on this application.

What is claimed is:

1. A server, comprising a data forwarding chip, a network interface card, and a target processor, wherein the data forwarding chip is separately connected to the network interface card and the target processor through a bus;
   the data forwarding chip is configured to receive a data forwarding request sent by the target processor or the network interface card, the data forwarding request including to-be-forwarded data; and
   forward, through a target endpoint port, the to-be-forwarded data included in the data forwarding request, wherein the target endpoint port is an endpoint port that is on the data forwarding chip and that is directly connected to a memory space corresponding to an address of the data forwarding request,
   wherein the data forwarding chip comprises at least two endpoint ports and is further configured to:
   determine the target endpoint port based on the address of the data forwarding request and memory distribution information of the server, wherein the memory distribution information comprises a correspondence between a memory space of the server and each of the at least two endpoint ports on the data forwarding chip.

2. The server according to claim 1, wherein the server comprises a plurality of processors, each of the plurality of processors corresponds to a memory space having a preset address range, and is directly connected to the corresponding memory space having the preset address range, the memory distribution information comprises a correspondence between each of the at least two endpoint ports and the memory space that has the preset address range and that corresponds to each of the plurality of processors, and the target processor is any of the plurality of processors.

3. The server according to claim 1, wherein
   the target processor is configured to send the data forwarding request to the data forwarding chip through the bus, wherein the data forwarding request carries a source address of the to-be-forwarded data; and
   the data forwarding chip is further configured to determine, based on the source address carried in the data forwarding request and the memory distribution information of the server, that an endpoint port directly connected to a memory space corresponding to the source address is the target endpoint port.

4. The server according to claim 1, wherein
   the network interface card is configured to send the data forwarding request to the data forwarding chip, wherein the data forwarding request is a data writing request sent by the network interface card to the target processor; and
   the data forwarding chip is further configured to determine, based on a preset destination address of the data writing request and the memory distribution information of the server, that an endpoint port directly connected to a memory space corresponding to the destination address is the target endpoint port, wherein the destination address is allocated by the target processor and is used to buffer an address corresponding to a memory space of the to-be-forwarded data.

5. The server according to claim 1, wherein
the data forwarding chip is further configured to:
determine, based on the target endpoint port, a path for forwarding the to-be-forwarded data, wherein the path comprises the target endpoint port; and
obtain, through the path, the to-be-forwarded data from the memory space corresponding to a source address of the to-be-forwarded data and buffer the to-be-forwarded data; and send, to the network interface card, a buffer address for buffering the to-be-forwarded data, so that the network interface card obtains the to-be-forwarded data based on the buffer address; or
obtain the to-be-forwarded data from the network interface card, and send, through the path, the to-be-forwarded data to the memory space corresponding to the address of the data forwarding request.

6. The server according to claim 1, wherein
the target processor is configured to: load a driver of the data forwarding chip, obtain the memory distribution information by running the driver, and send the memory distribution information to the data forwarding chip.

7. A server, comprising a data forwarding chip, a network interface card, and a target processor, wherein the data forwarding chip is separately connected to the network interface card and the target processor through a bus;
the data forwarding chip is configured to receive a data forwarding request sent by the target processor or the network interface card, the data forwarding request including to-be-forwarded data; and
forward, through a target endpoint port, the to-be-forwarded data included in the data forwarding request, wherein the target endpoint port is an endpoint port that is on the data forwarding chip and that is directly connected to a memory space corresponding to an address of the data forwarding request, wherein
the data forwarding chip is further configured to: enumerate the network interface card to obtain information about a functional unit in the network interface card, and allocate an address to the functional unit, wherein the functional unit is configured to implement a function of the network interface card, and the information about the functional unit comprises information about a physical function (PF) and/or information about a virtual function (VF);
the target processor is configured to: enumerate the data forwarding chip to obtain information about a proxy unit in the data forwarding chip, allocate an address to the proxy unit, and send address information of the proxy unit to the data forwarding chip, wherein the proxy unit is a proxy of the functional unit; and
the data forwarding chip is further configured to establish a correspondence between the address information of the proxy unit and address information of the functional unit based on the address information of the proxy unit.

8. The server according to claim 7, wherein
the data forwarding chip is further configured to forward the data forwarding request between the target processor and the network interface card based on the correspondence between the address information of the proxy unit in the data forwarding chip and the address information of the functional unit in the network interface card.

9. A data forwarding method, comprising:
receiving, by a data forwarding chip, a data forwarding request sent by a target processor a network interface card, the data forwarding request specifying to-be-forwarded data; and
forwarding, by the data forwarding chip through a target endpoint port, the to-be-forwarded data specified in the data forwarding request, wherein the target endpoint port is an endpoint port that is in at least two first endpoint ports on the data forwarding chip and that is directly connected to a memory space corresponding to an address of the data forwarding request, wherein
the data forwarding chip comprises the at least two first endpoint ports and a second endpoint port, the at least two first endpoint ports are respectively connected to at least two processors of a server, the second endpoint port is connected to the network interface card of the server, and the target processor is any of the at least two processors; and the method further comprises:
determining, by the data forwarding chip, the target endpoint port based on the address of the data forwarding request and memory distribution information of the server, wherein the memory distribution information comprises a correspondence between a memory space of the server and each of the at least two first endpoint ports.

10. The method according to claim 9, wherein the memory space of the server has a preset address range and corresponds to each of the at least two processors, and each processor is directly connected to the corresponding memory space having the preset address range.

11. The method according to claim 9, wherein the determining, by the data forwarding chip, the target endpoint port based on the address of the data forwarding request and the memory distribution information of the server comprises:
obtaining, by the data forwarding chip through any of the at least two first endpoint ports, the data forwarding request sent by the target processor, wherein the data forwarding request carries a source address of the to-be-forwarded data; and
determining, by the data forwarding chip based on the source address carried in the data forwarding request and the memory distribution information of the server, that a first endpoint port directly connected to a memory space corresponding to the source address is the target endpoint port.

12. The method according to claim 9, wherein the determining, by the data forwarding chip, the target endpoint port based on the address of the data forwarding request and the memory distribution information of the server comprises:
receiving, by the data forwarding chip, the data forwarding request sent by the network interface card, wherein the data forwarding request is a data writing request sent by the network interface card to the target processor; and
determining, by the data forwarding chip based on a preset destination address of the data writing request and the memory distribution information of the server, that a first endpoint port directly connected to a memory space corresponding to the destination address is the target endpoint port, wherein the destination address is allocated by the target processor and is used to buffer an address corresponding to a memory space of the to-be-forwarded data.

13. The method according to claim 9, wherein the forwarding, by the data forwarding chip through a target endpoint port, the to-be-forwarded data specified in the data forwarding request comprises:

determining, by the data forwarding chip based on the target endpoint port, a path for forwarding the to-be-forwarded data, wherein the path comprises the target endpoint port; and obtaining, by the data forwarding chip through the path, the to-be-forwarded data from the memory space corresponding to a source address of the to-be-forwarded data and buffering the to-be-forwarded data; and sending, to the network interface card, a buffer address for buffering the to-be-forwarded data, so that the network interface card obtains the to-be-forwarded data based on the buffer address; or obtaining, by the data forwarding chip, the to-be-forwarded data from the network interface card, and sending, through the path, the to-be-forwarded data to the memory space corresponding to the address of the data forwarding request.

14. The method according to claim 9, before the forwarding, by the data forwarding chip through a target endpoint port, the to-be-forwarded data specified in the data forwarding request, further comprising:

enumerating, by the data forwarding chip, the network interface card to obtain information about a functional unit in the network interface card, and allocating an address to the functional unit, wherein the functional unit is configured to implement a function of the network interface card, and the information about the functional unit comprises information about a physical function (PF) and/or information about a virtual function (VF);

receiving, by the data forwarding chip, address information that is of a proxy unit and that is sent by the target processor, wherein the proxy unit is a proxy that is of the functional unit and that is in the data forwarding chip; and establishing, by the data forwarding chip, a correspondence between the address information of the proxy unit and address information of the functional unit based on the address information of the proxy unit.

15. The method according to claim 14, further comprising:

forwarding, by the data forwarding chip, the data forwarding request between the target processor and the network interface card based on the address information of the proxy unit and the address information of the functional unit.

* * * * *

UNITED STATES PATENT AND TRADEMARK OFFICE
CERTIFICATE OF CORRECTION

PATENT NO. : 11,829,309 B2
APPLICATION NO. : 17/698059
DATED : November 28, 2023
INVENTOR(S) : Mingjian Que Page 1 of 1

It is certified that error appears in the above-identified patent and that said Letters Patent is hereby corrected as shown below:

In the Specification

Column 5, Line 14, change "YE" to "VF.";

Column 12, Line 25, change "PE" to "PF.";

Column 17, Line 54, change "PF" to "PF'";

Column 17, Line 55, change "VF" to "VF'"; and

Column 22, Line 32, change "VP" to "VF'".

Signed and Sealed this
Second Day of January, 2024

Katherine Kelly Vidal
*Director of the United States Patent and Trademark Office*